(12) United States Patent
Miao et al.

(10) Patent No.: US 10,454,717 B2
(45) Date of Patent: Oct. 22, 2019

(54) METHODS OF PERFORMING COMMUNICATIONS, MOBILE TERMINAL DEVICES, AND BASEBAND MODEMS

(71) Applicant: Intel IP Corporation, Santa Clara, CA (US)

(72) Inventors: Honglei Miao, Munich (DE); Tianyan Pu, Dresden (DE); Biljana Badic, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/758,746

(22) PCT Filed: Aug. 10, 2016

(86) PCT No.: PCT/US2016/046221
§ 371 (c)(1),
(2) Date: Mar. 9, 2018

(87) PCT Pub. No.: WO2017/052823
PCT Pub. Date: Mar. 30, 2017

(65) Prior Publication Data
US 2019/0036738 A1    Jan. 31, 2019

(30) Foreign Application Priority Data
Sep. 25, 2015    (DE) .......................... 10 2015 116 247

(51) Int. Cl.
*H04W 4/00*    (2018.01)
*H04L 25/02*    (2006.01)
(Continued)

(52) U.S. Cl.
CPC .......... *H04L 25/022* (2013.01); *H04L 1/0003* (2013.01); *H04L 5/00* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS 9,986,451 B2 *  5/2018  Chae ..................... H04W 24/08
2009/0110044 A1 * 4/2009  Wu ..................... H04L 25/0212
                                                              375/231

(Continued)

FOREIGN PATENT DOCUMENTS

WO    2013181394 A1    12/2013
WO    2015095586 A1    6/2015

OTHER PUBLICATIONS

German Office Action based on application No. 10 2015 116 247.4 (7 pages) dated May 20, 2016 (Reference Purpose Only).

(Continued)

*Primary Examiner* — Siren Wei
(74) *Attorney, Agent, or Firm* — Viering, Jentschura & Partner MBB

(57) ABSTRACT

A mobile terminal device includes a radio processing circuit and a baseband processing circuit adapted to interact with the radio processing circuit. The mobile terminal device is configured to identify a first set of frequency resources allocated for a wireless channel by a mobile communication network, calculate a first channel response estimate for a second set of frequency resources of the wireless channel using a reference signal derived from a second mobile terminal device, wherein the reference signal is distributed across the second set of frequency resources of wireless channel, calculate a second channel response estimate for the first set of frequency resources of the wireless channel using the first channel response estimate, and apply the second channel response estimate to schedule data transmission intended for the second mobile terminal device over the wireless channel.

23 Claims, 8 Drawing Sheets

(51) Int. Cl.
*H04L 5/00* (2006.01)
*H04L 1/00* (2006.01)
*H04W 56/00* (2009.01)
*H04W 88/02* (2009.01)

(52) U.S. Cl.
CPC .............. *H04L 5/005* (2013.01); *H04L 25/02* (2013.01); *H04L 25/0224* (2013.01); *H04L 25/0256* (2013.01); *H04W 56/001* (2013.01); *H04W 88/02* (2013.01)

(56) References Cited

U.S. PATENT DOCUMENTS

| | | | |
|---|---|---|---|
| 2010/0165072 A1* | 7/2010 | Oike | H04L 12/1822 348/14.09 |
| 2012/0147761 A1 | 6/2012 | Zhang et al. | |
| 2012/0163252 A1* | 6/2012 | Ahn | H04L 1/0003 370/280 |
| 2013/0083684 A1 | 4/2013 | Yeh et al. | |
| 2013/0114767 A1* | 5/2013 | Lee | H04L 25/0212 375/346 |
| 2014/0169326 A1 | 6/2014 | Levanen et al. | |
| 2014/0219095 A1* | 8/2014 | Lim | H04W 72/085 370/235 |
| 2015/0043483 A1 | 2/2015 | Sartori et al. | |
| 2015/0208453 A1* | 7/2015 | Yamazaki | H04W 76/14 370/329 |
| 2016/0249198 A1* | 8/2016 | Kim | H04W 48/16 |

OTHER PUBLICATIONS

International Search Report based on application No. PCT/US2016/046221 (9 pages) dated Nov. 3, 2016 (Reference Purpose Only).

* cited by examiner

METHODS OF PERFORMING COMMUNICATIONS, MOBILE TERMINAL DEVICES, AND BASEBAND MODEMS

RELATED APPLICATIONS

The present application is a national stage entry according to 35 U.S.C. § 371 of PCT application No.: PCT/US2016/046221 filed on Aug. 10, 2016, which claims priority from German application No.: 10 2015 116 247.4 filed on Sep. 25, 2015, and is incorporated herein by reference in its entirety.

TECHNICAL FIELD

Various embodiments relate generally to methods of performing communications, mobile terminal devices, and baseband modems.

BACKGROUND

Long Term Evolution (LTE) Release 12 by the Third Generation Partnership Project (3GPP) has designated a new set of "sidelink" physical channels and signaling framework to support Proximity Services (ProSe, also known as Device-to-Device or "D2D") communications, including e.g. ProSe Discovery and ProSe Communication. Mobile terminals may utilize ProSe in order to directly exchange data using radio resources conventionally allocated for uplink communications by the mobile communication network. While the mobile communication network may assume a supervisory role, such as by allocating the radio resources that may mobile terminals may utilize for ProSe and other management operations, mobile terminals may exchange data between one another without transmitting the data to the mobile communication network.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
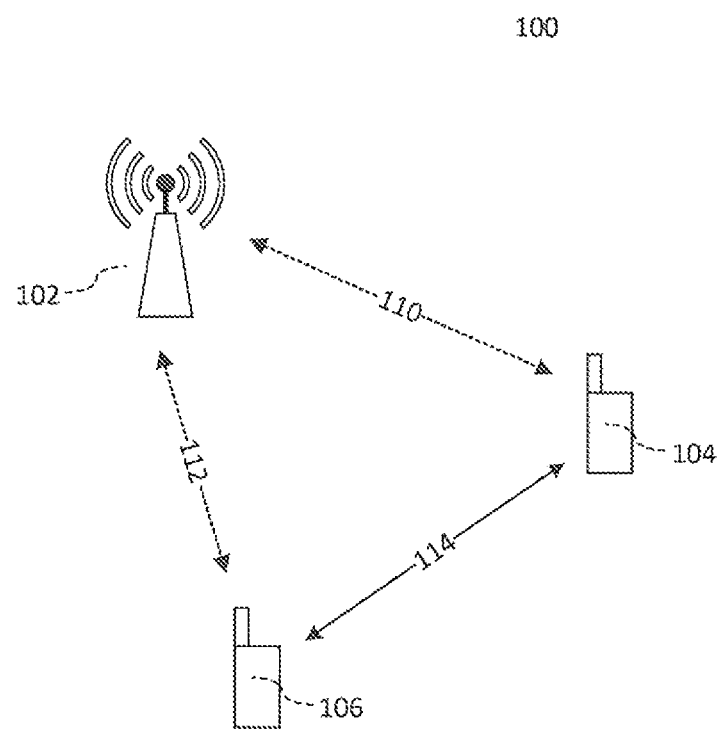
FIG. 1 shows a mobile communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

It is appreciated that any vector and/or matrix notation utilized herein is exemplary in nature and is employed solely for purposes of explanation. Accordingly, it is understood that the approaches detailed in this disclosure are not limited to being implemented solely using vectors and/or matrices, and that the associated processes and computations may be equivalently performed with respect to sets, sequences, groups, etc., of data, observations, information, signals, etc.

Furthermore, it is appreciated that references to a "vector" may refer to a vector of any size or orientation, e.g. including a 1×1 vector (e.g. a scalar), a 1×M vector (e.g. a row vector), and an M×1 vector (e.g. a column vector). Similarly, it is appreciated that references to a "matrix" may refer to matrix of any size or orientation, e.g. including a 1×1 matrix (e.g. a scalar), a 1×M matrix (e.g. a row vector), and an M×1 matrix (e.g. a column vector).

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry"

in the claims included herein, the use of "circuit" may be understood as collectively referring to two or more circuits.

A "processing circuit" (or equivalently "processing circuitry") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), microprocessor(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRHs), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

The term "network" as utilized herein, e.g. in reference to a communication network such as a mobile communication network, is intended to encompass both an access component of a network (e.g. a radio access network (RAN) component) and a core component of a network (e.g. a core network component).

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

User equipment (UE(s)) may utilize Proximity Services (ProSe, also known as Device-to-Device or "D2D") as specified by the Third Generation Partnership Project (3GPP) in order to directly exchange data between one another. ProSe-enabled mobile terminals may thus not require a network access point of a mobile communication network to assume an intermediary role for data exchange, e.g. may not need to first transmit data to a base station. ProSe as specified by 3GPP may include ProSe Discovery and ProSe Communications (collectively referred to herein as ProSe operations), which may both utilize dedicated uplink radio resources in order to support exchange of data using ProSe. While the mobile communication network may provide a supervisory role, such as in determining specifically which uplink radio resources are allocated for ProSe use, the actual exchange of data between UEs performing ProSe may not rely on network access points of the mobile communication network, such as e.g. base stations, to supply an intermediary role.

3GPP Long Term Evolution (LTE) Release 12 has designated a set of "sidelink" physical channels and signaling framework to support ProSe. ProSe-enabled UEs may utilize the sidelink channels and signaling framework in order to communicate both with the mobile communication network (e.g. via base stations) and other ProSe-enabled UEs, thereby facilitating the direct exchange of data between ProSe-enabled UEs under supervision of the mobile communication network.

The sidelink channels specified by 3GPP include the Physical Sidelink Control Channel (PSCCH) and Physical Sidelink Shared Channel (PSSCH), which may operate in a similar manner as to the traditional 3GPP-specified uplink physical channels Physical Control Channel (PUCCH) and Physical Uplink Shared Channel (PUSCH), respectively. The physical sidelink channels may utilize radio resources conventionally allocated for uplink communications, where a serving cell may designate the specific sidelink radio resources available for use by a given UE (e.g. assuming the UE is in coverage of the mobile communication network). As will be detailed, a serving cell of a ProSe-enabled UE may indicate to the ProSe-enabled UE which uplink time-frequency resources may be utilized for ProSe operations. Accordingly, the set of sidelink resources, i.e. the sidelink resource pool, may be a subset of the set of available uplink resources, i.e. the uplink resource pool.

Traditional mobile communications, including e.g. LTE, may utilize channel response estimates in order to effectively utilize wireless resources. Such channel response estimates may be based on reference signals. For example, a LTE-configured UE may utilize Cell Specific Reference Signals (CRS) and Channel State Information Reference Signals (CSI-RS) received from a serving cell in order to estimate the downlink channel quality over the entire system bandwidth. Similarly in an uplink scenario, an LTE-configured serving cell may receive Sounding Reference Signals (SRS) from a transmitting UE in order to estimate the downlink channel quality. The resulting channel response estimates may be utilized for a variety of procedures designed to improve system performance, including link adaptation (i.e. modulation scheme and coding rate) and frequency selective scheduling.

Such procedures based on channel response estimates may be effective largely due to the availability of a channel response estimate characterizing the entire system bandwidth. For example, the aforementioned reference signals (CRS, CSI-RS, and SRS) are transmitted substantially over the entire system bandwidth (i.e. distributed across the entire system bandwidth). Accordingly, obtaining a channel response estimate based on these wide-band reference signals may provide a channel response estimate that fully characterizes the entire system bandwidth. Procedures such as frequency selective scheduling may therefore be effective as the channel response estimate may fully characterize the entire system bandwidth.

While ProSe as specified by 3GPP does utilize several reference signals, including e.g. Demodulation Reference Signals (DMRS), Primary Sidelink Synchronization Signals (PSSS), and Secondary Sidelink Synchronization Signals (SSSS), these reference signals are relatively narrowband with respect to the entire sidelink bandwidth, and thus are not distributed over the entire allocated sidelink bandwidth. Accordingly, channel response estimates derived directly from the aforementioned reference signals may only accurately characterize a relatively limited frequency range of the sidelink resource pool.

Accordingly, the effectiveness of procedures such as frequency selective scheduling and link adaptation may be negatively impacted in the absence of a comprehensive channel response estimate that characterizes the entire sidelink bandwidth. Although the mobile communication network may specify the sidelink resource pool, a ProSe-enabled mobile terminal may exercise a degree of control over the specific sidelink time-frequency resources used for transmission of data to another ProSe-enabled mobile terminal, e.g. as part of ProSe Communication. For example, a ProSe-enabled mobile terminal may be able to identify specific time-frequency resources of the sidelink resource pool to transmit data to another ProSe-enabled mobile terminal, such as e.g. selecting subcarriers (i.e. frequency resources) from the sidelink resource pool to transmit the data, selecting a time (i.e. time resource) from the sidelink resource pool to transmit the data, selecting a modulation scheme for transmission of the data, selecting a coding rate for transmission of the data, etc.

Accordingly, ProSe may be improved by implementing a procedure to effectively obtain channel response estimates characterizing the entire sidelink bandwidth. An improved solution may utilize comparatively narrowband reference signals, such as e.g. the existing PSSS and SSSS already specified by 3GPP for ProSe, in order to accurately characterize the entire sidelink bandwidth. Such a solution may conserve wireless resources compared to the introduction of a new "wideband" reference signal(s) while still allowing for effective procurement of channel response estimates for the entire sidelink bandwidth.

FIG. 1 shows mobile communication network 100. As shown in FIG. 1, mobile communication network 100 may include base station 102 (which may be e.g. an evolved nodeB or "eNodeB"), mobile terminal 104, and mobile terminal 106 (for example, mobile terminals 104 and 106 may be, respectively, referred to as user equipment UE 104 and UE 106 in a LTE network). Mobile terminal 104 and mobile terminal 106 may be ProSe-enabled, i.e. may be capable of performing ProSe operations. It is noted that although the following description refers to mobile radio communication network 100 as being configured in accordance with a Long Term Evolution (LTE) configuration, mobile communication radio network 100 may be configured in accordance with the network architecture of any one of, or any combination of, UTE (Long Term Evolution), WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc.

Each of the UEs 104 and 106 may be coupled to a respective serving cell. As depicted in FIG. 1, the respective serving cells of UEs 104 and 106 may be located at base station 102, and UEs 104 and 106 may be in the same cell or different cells. Alternatively, the respective serving cells of UEs 104 and 106 may be located at separate base stations, e.g. base station 102 and another base station (not shown).

UEs 104 and 106 may each exchange data with base station 102 over respective air interfaces 110 and 112, where each of respective air interfaces 110 and 112 correspond to the respective serving cell(s) of UEs 104 and 106 of base station 102.

Base station 102 may be associated with mobile communication network 100, and thus may act as interface between the radio access network of mobile communication network 100 (including uplink air interfaces 110 and 112) and the underlying core network of mobile communication network 100. UEs 104 and 106 may exchange communication data with base station 102 using air interfaces 110 and 112, including uplink and downlink user and/or control data.

As previously indicated, UEs 104 and 106 may be ProSe-enabled, and thus may also be configured to directly exchange data with one another using ProSe air interface 114.

Each of air interfaces 110-114 may utilize a specific set of physical wireless resources, i.e. time-frequency resources, to carry data. Each of air interfaces 110-114 may also be bi-directional, and accordingly may also utilize different subsets of time-frequency resources for wireless data transport in each direction, e.g. a time duplexing or frequency duplexing system.

Specifically, air interfaces 110 and 112 may each include an uplink path and a downlink path, which may utilize different frequency resources (i.e. frequency duplexing) or different time resources (i.e. time duplexing). The specific time-frequency resources allocated for the downlink path and uplink path of each of air interfaces 110 and 112 may be specified by mobile communication network 100 and may be indicated to UEs 104 and 106.

In accordance with a ProSe architecture as specified by 3GPP, ProSe air interface 114 may share time-frequency resources allocated for uplink transmissions, i.e. may utilize time-frequency resources allocated for the uplink paths of air interfaces 110 and 112. Base station 102 may identify time-frequency resources originally allocated for uplink transmission and subsequently assign the time-frequency resources for ProSe use, thereby allowing UEs 104 and 106 (and e.g. any other proximate ProSe-enabled terminals) to utilize the specified resources, i.e. the "sidelink resource pool" for ProSe Discover and/or Communication. UEs 104 and 106 may identify the specified sidelink resource pool using control information received from the respective serving cells at base station 102, such as by receiving and reading System Information Blocks (SIBs) transmitted by base station 102 on air interfaces 110 and 112.

Figure 2:
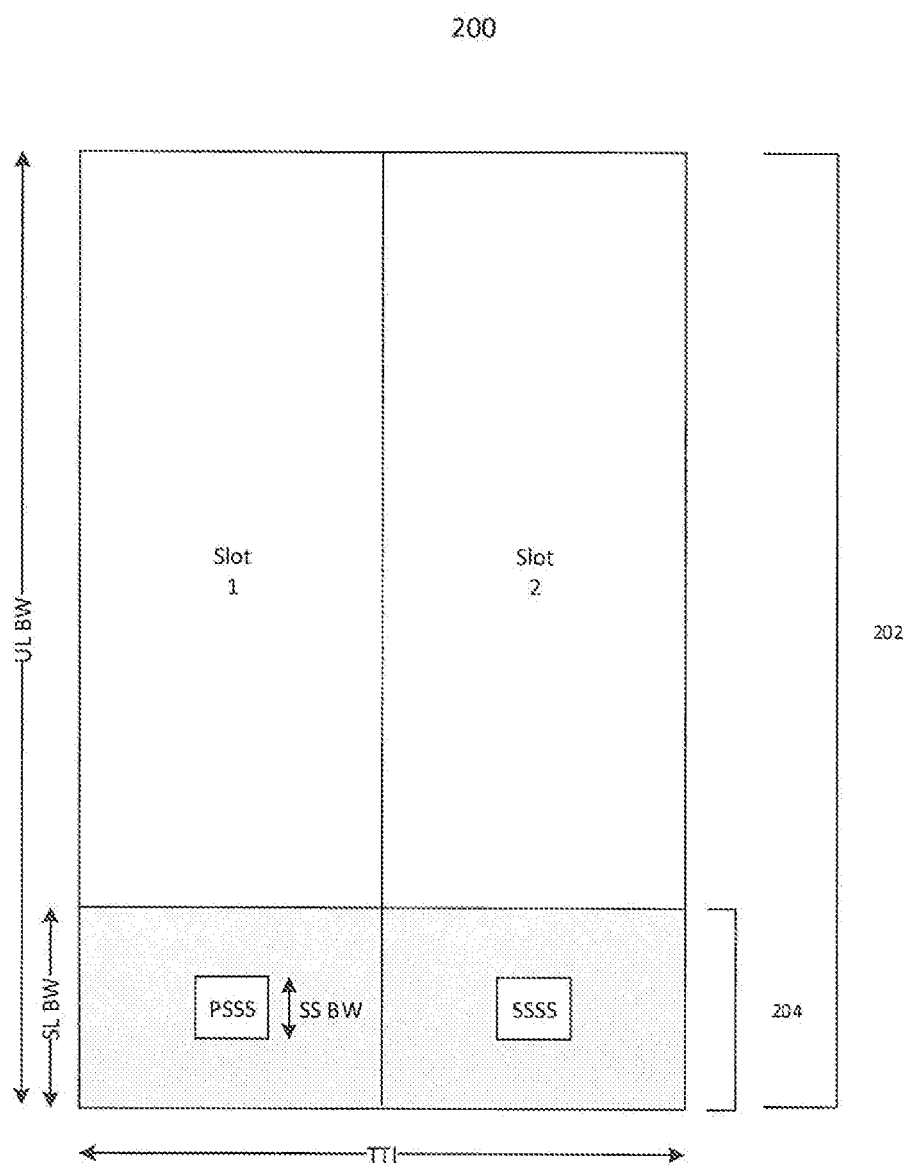
FIG. 2 shows a resource grid detailing uplink and sidelink resource pools for mobile communications.

FIG. 2 shows resource grid 200. Resource grid 200 depicts an exemplary wireless resource allocation of uplink and sidelink resources along the frequency axis and time axis over one Transmission Time Interval (TTI), which may be e.g. 1 subframe=1 millisecond.

As depicted in FIG. 2, uplink resource pool 202 may span over the entire uplink bandwidth. Sidelink resource pool 204 may be selected as a frequency band (i.e. set of one or more subcarriers) of contiguous frequencies within uplink resource pool 202. Sidelink resource pool 204 may typically be composed of a set of contiguous Physical Resource Blocks (PRBs), and may thus be specified by base station 102 by indicating the starting PRB and the number of PRBs allocated for sidelink resource pool 204. Sidelink resource pool 204 may be configured as a number of contiguous PRBs at the lower end of uplink resource pool 202, as illustrated in FIG. 2. However, it is understood that other positions of sidelink resource pool 204 within uplink resource pool 202 are also possible. For example, sidelink resource pool 204 may be located at the upper end of uplink resource pool 202, middle of uplink resource pool 202, separated into multiple different subsections within uplink resource pool 202, etc.

A UE may determine sidelink resource pool 204 (i.e. the time-frequency resources of uplink resource pool 202 allocated for sidelink resource pool 204) by reading system information received from a base station, such as e.g. System Information Block 18 (SIB18) or System Information Block 19 (SIB19) as specified by 3GPP. For example, UEs 104 and 106 may receive system information from base station 102 that indicates the starting frequency resource (i.e. subcarrier) and the number of following frequency resources that constitute the sidelink resource pool.

UEs 104 and 106 may thus utilize the wireless resources allocated for sidelink resource pool 204 for ProSe, including ProSe Discovery and ProSe Communication. For example, UEs 104 and 106 may detect one another using ProSe Discovery and potentially initialize data exchange using ProSe Communication. Each ProSe-enabled UE may be configured by one or more PSSCH and PSCCH resource pools, where each resource pool is configured as either receive-only or transmit-receive. The configuration of each resource pool defines the physical radio resources, i.e. time-frequency resources, allocated to the corresponding sidelink channel.

UEs 104 and 106 may utilize the PSSCH and PSCCH in order to facilitate ProSe operations, where PSSCH and PSCCH data may be exchanged between UEs 104 and 106 using air interface 114. For example, mobile terminal 104 may desire to transmit a data packet to mobile terminal 106 using ProSe following establishment of a ProSe Communication link. Mobile terminal 104 may therefore transmit a scheduling assignment (SA) to mobile terminal 106 on the PSCCH, which may indicate the specific time-frequency resources of sidelink resource pool 204 that will be utilized to transmit the data packet. Mobile terminal 104 may then transmit the data packet to mobile terminal 106 on the PSSCH using the specified time-frequency resources, which mobile terminal 106 may utilize in order to effectively receive the data packet.

ProSe operations may rely on several reference signals in order to support effective exchange of ProSe data, including Demodulation Reference Signals (DMRS), Primary Sidelink Synchronization Signals (PSSS), and Secondary Sidelink Synchronization Signals (SSSS).

In the exemplary scenario detailed above regarding transmission of a data packet from mobile terminal 104 to mobile terminal 106, mobile terminal 104 may additionally transmit a DMRS pattern to mobile terminal 106. Mobile terminal 106 may receive the DMRS pattern and utilize the received DMRS pattern in order to perform channel estimation and coherent demodulation of PSCCH and PSSCH data received from mobile terminal 104, thereby improving reception performance.

PSSS and SSSS may be utilized for synchronization and identification purposes. Specifically, a transmitting ProSe such as mobile terminal 104 in FIG. 1 may be utilized in order to broadcast the identity of mobile terminal 104. For example, mobile terminal 104 may broadcast a specific PSSS and SSSS combination in order to signal the Sidelink Identity (SID) of mobile terminal 104, which may range from 0-167 for in-coverage UEs and 168-335 for out-of-coverage UEs. A receiving ProSe UE such as mobile terminal 106 may identify a transmitting ProSe UE such as mobile terminal 104 based on the PSSS and SSSS pattern transmitted by the transmitting ProSe UE.

Additionally, a receiving ProSe UE may utilize a PSSS and SSSS pattern received from a transmitting ProSe UE in order to obtain a time-frequency reference with which to synchronize exchange of ProSe data. For example, mobile terminal 106 may utilize a PSSS and SSSS pattern received from mobile terminal 104 in order to identify the proper time-frequency reference for receiving a data packet from mobile terminal 104.

As depicted by resource grid 200, a ProSe transmitting UE may transmit a PSSS and SSSS pattern once during each Transmission Time Interval (TTI), which may correspond to a 1 millisecond subframe in accordance with an LTE network configuration. ProSe transmitting UEs may transmit such PSSS and SSSS patterns during subframes specifically designated for synchronization and the scheduling of such synchronization subframes is configured by higher layers. Each TTI may be divided into two subsequent slots of 0.5 milliseconds in duration, where PSSS and SSSS patterns are transmitted in separate contiguous slots of a given synchronization subframe.

Accordingly, mobile terminal 104 may obtain time-frequency synchronization (i.e. by identifying a time-frequency reference) with mobile terminal 106 by detecting a PSSS and SSSS sequence transmitted by mobile terminal 106.

As illustrated in FIG. 2, the synchronization signal bandwidth utilized for PSSS and SSSS patterns may be less than the sidelink bandwidth. In accordance with an LTE network configuration, the PSSS and SSSS patterns may be transmitted over the central 6 PRBs of sidelink resource pool 204, and accordingly any further PRBs allocated to sidelink resource pool 204 may not contain any PSSS or SSSS.

In the exemplary scenario detailed above, mobile terminal 104 transmits PSSS and SSSS to mobile terminal 106. However, mobile terminal 104 may receive PSSS and/or SSSS from the mobile terminal 106, as well (i.e. using a time-frequency reference obtained by detecting a previous PSSS and/or SSSS sequence from mobile terminal 106). As PSSS and SSSS sequences are predefined, mobile terminal 104 may then be able to derive a channel response estimate based on the received PSSS and/or SSSS sequence, such as by performing a Fourier transform on the received PSSS and/or SSSS sequence and analyzing the frequency domain PSSS and/or SSSS sequence in comparison with predefined PSSS and/or SSSS sequences. Mobile terminal 104 may then be able to utilize a resulting channel frequency response estimate to identify frequency ranges having strong channel conditions.

However, as PSSS and SSSS sequences may only be transmitted in the central region (e.g. central 6 PRBs as specified by 3GPP) of sidelink resource pool 204, the resulting channel frequency response estimate may only characterize the channel frequency response in this central region of sidelink resource pool 204. While mobile terminal 104 may be able to utilize the resulting channel frequency response estimate to evaluate the wireless channel quality in the central region, the resulting channel frequency response estimate derived directly from the PSSS and/or SSSS sequence may be unfit for evaluations of frequency resources outside of the central region of PSSS and/or SSSS sequence. Accordingly, mobile terminal 104 may not be able to effectively utilize the resulting channel frequency response to select frequency resources for ProSe data transmission to mobile terminal 106 or to evaluate a set of frequency resources based on the resulting channel frequency response to select a modulation scheme and/or coding rate for ProSe data transmission to mobile terminal 106 using the set of frequency resources.

Accordingly, mobile terminal 104 may rely on certain characteristics of wireless channels between ProSe-enabled mobile terminals engaging in ProSe operations in order to utilize the available channel response estimates characterizing the synchronization signal bandwidth, i.e. channel response estimates based directly on PSSS and/or SSSS sequences, in order to calculate channel response estimates that characterize the entire sidelink bandwidth.

In conventional mobile communications between a UE and a base station, the wireless channel may be largely frequency-selective, i.e. the wireless channel behavior may significantly differ according to frequency. Accordingly, the wireless channel may enhance certain frequencies while attenuating other frequencies. Typical causes of frequency-selective channels may be multipath fading caused by multipath propagation and/or shadow fading caused by wave propagation through objects.

Frequency-selective channels stemming from multipath fading may be prevalent in many mobile communication scenarios, where the arrival of different multipath components of a wirelessly transmitted original signal may result in constructive or destructive interference over one or more different frequencies based on the attenuation, delay, and phase shift of each respective multipath component. The coherence bandwidth of a channel, i.e. the range of frequencies over which the channel frequency response is substantially flat, may be inversely correlated to the multipath delay spread, i.e. the separation in time between the arrival of the earliest multipath component (typically the Line-of-Sight (LOS) component) and the latest multipath component. Accordingly, wireless channels having relatively small multipath delay spread may exhibit a flat channel frequency response over a wide range of frequencies, where wireless channels having relatively large multipath delay spread may exhibit very little or no flat frequency ranges in the channel frequency response.

ProSe between UEs may be utilized over relatively short distances compared to conventional mobile communications between a base station and UE, such as e.g. several hundred meters. As a result of the relatively short wireless propagation distance, ProSe transmissions between UEs may have significantly reduced delay spread, thereby resulting in an increased coherence bandwidth. In contrast to conventional wireless channels between a UE and a base station, wireless channels between ProSe-enabled UEs such as air interface 114 may be relatively flat.

Due to the relatively flat channel frequency responses often seen in wireless channels between ProSe-enabled UEs, a ProSe transmitting UE may be able to use a relatively narrowband channel response estimate, e.g. a channel response estimate only characterizing part of the sidelink bandwidth, to estimate the channel response for other frequency ranges. Specifically, a ProSe transmitting UE may be able to derive a channel response estimate based on PSSS and/or SSSS received from another ProSe-enabled UE (i.e. relatively narrowband compared to the entire sidelink bandwidth) and expand the narrowband channel response estimate (i.e. based directly on PSSS, SSSS, and/or any other potential narrowband reference signal) to characterize the entire sidelink bandwidth. As the wireless channel is assumed to be relatively flat, such an approach may accurately characterize the channel response of the entire sidelink bandwidth. A ProSe transmitting UE may then apply the resulting sidelink channel response estimate to improve system performance, such as by applying e.g. link adaptation and/or frequency selective scheduling using the sidelink channel response estimate. Specifically, the ProSe transmitting UE may schedule and transmit a data packet to the other ProSe-enabled UE from which the PSSS and/or SSSS was received from based on the obtained sidelink channel response estimate.

This sidelink channel response estimation procedure may thus be utilized to transmit ProSe data between a source ProSe-enabled UE (e.g. mobile terminal 104) and a sink ProSe-enabled UE (e.g. mobile terminal 106). While certain exemplary scenarios detailed herein may apply specifically to channel response estimates derived from PSSS and/or SSSS, it is appreciated that any such "narrowband" reference signal, i.e. a reference signal occupying a frequency range smaller than the desired frequency range, may be similarly utilized. Accordingly, further reference signals, such as any subsequently introduced by 3GPP, occurring in a partial band of the sidelink resource pool may be similarly utilized to derive a channel response estimate that fully characterizes the entire sidelink resource pool.

The sidelink channel response estimation procedure may be executed by the source ProSe-enabled UE using such narrowband reference signals and may be summarized as follows:

1. Identify time-frequency reference for a narrowband reference signal(s) transmitted by a sink terminal
2. Calculate narrowband channel frequency response estimate (frequency domain) $\hat{h}_{SS}$ using the narrowband reference signal(s)
3. Calculate the channel impulse response (time domain) $\hat{h}$ using $\hat{h}_{SS}$
4. Calculate the wideband channel frequency response estimate (frequency domain) $\hat{h}_{SL}$ using $\hat{h}$ 5. Apply $\hat{h}_{SL}$ to selectively allocate sidelink resources for ProSe transmission Accordingly, the sidelink channel response estimation procedure may be utilized by a ProSe-enabled UE such as e.g. mobile terminal 104 in order to determine a channel frequency response estimate for the entire sidelink resource pool based on PSSS and/or SSSS received from mobile terminal 106. Mobile terminal 104 may then apply the channel frequency response estimate to allocate resources for ProSe transmissions. Due to the flat channel frequency response assumption, the narrowband channel frequency response estimate derived from PSSS and/or SSSS sequences may be sufficient to characterize the entire sidelink bandwidth.

Figure 3:
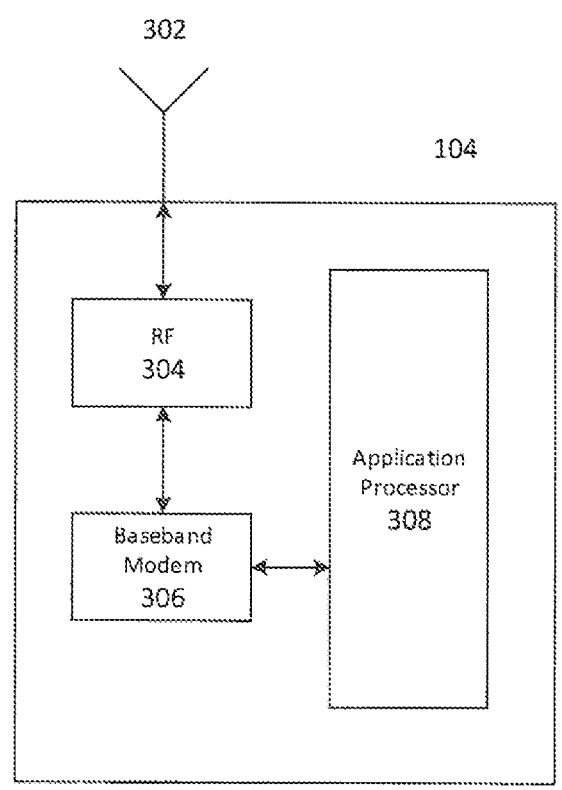
FIG. 3 shows an internal configuration of a mobile terminal.

FIG. 3 shows a block diagram illustrating an internal configuration of mobile terminal 104 according to an aspect of the disclosure. As will be detailed, mobile terminal 104 may be configured to calculate a channel response estimate for a sidelink frequency band based on PSSS and/or SSSS received from a sink mobile terminal and utilize the sidelink channel response estimate to transmit ProSe data to the sink mobile terminal.

As illustrated in FIG. 3, mobile terminal 104 may include antenna 302, radio frequency (RF) transceiver 304, baseband modem 306, and application processor 308. As shown in in FIG. 3, the aforementioned components of mobile terminal 104 may be implemented as separate components. However, it is appreciated that the architecture of mobile terminal 104 depicted in FIG. 3 is for purposes of explanation, and accordingly one or more of the aforementioned components of mobile terminal 104 may be integrated into a single equivalent component or divided into two separate components with collective equivalence. It is understood that mobile terminal 104 may have one or more additional components, such as additional hardware, software, or firmware elements. For example, mobile terminal 104 may further include various additional components including hardware, firmware, processors, microprocessors, memory, and other specialty or generic hardware/processors/circuits, etc., in order to support a variety of additional operations. Mobile terminal 104 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

It is appreciated that the aforementioned components of mobile terminal 104, in particular, RF transceiver 304, baseband modem 306, and application processor 308 may be implemented in a number of different manners, such as by hardware, firmware, software executed on hardware (e.g. a processor), or any combination thereof. Various option include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

As will be detailed, in an aspect of the disclosure mobile terminal 104 may be a mobile terminal device having a radio processing circuit (RF transceiver 304) and a baseband processing circuit (baseband modem 306) adapted to interact with the radio processing circuit. Mobile terminal 104 may be configured to identify a first set of frequency resources allocated for a wireless channel by a mobile communication network, calculate a first channel response estimate for a second set of frequency resources of the wireless channel using a reference signal derived from a second mobile terminal device, wherein the reference signal is distributed across the second set of frequency resources of wireless channel, calculate a second channel response estimate for the first set of frequency resources of the wireless channel using the first channel response estimate, wherein the first set of frequency resources includes a greater bandwidth of the wireless channel than the second set of frequency resources, and apply the second channel response estimate to schedule data transmission intended for the second mobile terminal device over the wireless channel.

In a further aspect of the disclosure, mobile terminal 104 may be a mobile terminal device having a radio processing circuit (RF transceiver 304) and a baseband processing circuit (baseband modem 306) adapted to interact with the radio processing circuit. Mobile terminal 104 may be configured to receive a reference signal on a second set of frequency resources of the wireless channel, wherein the reference signal is derived from a second mobile terminal device and the first set of frequency resources has a greater bandwidth than the second set of frequency resources, ascertain a first channel response estimate for the second set second set of frequency resources of the wireless channel using the reference signal, ascertain a second channel response estimate for the first set of frequency resources of the wireless channel using the first channel response estimate, and apply the second channel response estimate to schedule data transmission to the second mobile terminal device over the wireless channel.

In an abridged overview of the operation of mobile terminal 104, mobile terminal 104 may be configured to receive and/or transmit wireless signals according to multiple different wireless access protocols or radio access technologies (RATS), including any one of, or any combination of, LTE (Long Term Evolution), WLAN (wireless local area network), WiFi, UNITS (Universal Mobile Telecommunications System), GSM (Global System for Mobile Communications), Bluetooth, CDMA (Code Division Multiple Access), Wideband CDMA (W-CDMA), etc. It is appreciated that separate components may be provided for each distinct type of compatible wireless signals, such as a dedicated LTE antenna, RF transceiver, and baseband modem for LTE reception and transmission and a dedicated WiFi antenna, RF transceiver, and baseband modern for WiFI reception and transmission. Alternatively, one or more components of mobile terminal 104 may be shared between different wireless access protocols, such as e.g. by sharing antenna 302 between multiple different wireless access protocols. In an exemplary aspect of disclosure, RF transceiver 304 and/or baseband modem 306 may operate according to multiple mobile communication access protocols (i.e. "multi-mode"), and thus may be configured to support one or more of LIE, UMTS, and/or GSM access protocols.

Further according to the abridged overview, RF transceiver 304 may receive radio frequency wireless signals via antenna 302, which may be implemented as e.g. a single antenna or an antenna array composed of multiple antennas. RF transceiver 304 may include various reception circuitry elements, which may be e.g. analog circuitry, configured to process externally received signals, such as mixing circuity to convert externally received RF signals to baseband and/or intermediate frequencies. RF transceiver 304 may also include amplification circuitry to amplify externally received signals, such as power amplifiers (PAs) and/or Low Noise Amplifiers (LNAs), although it is appreciated that such components may also be implemented separately. RF transceiver 304 may additionally include various transmission circuitry elements configured to transmit internally received signals, such as e.g. baseband and/or intermediate frequency signals provided by baseband modem 306, which may include mixing circuitry to modulate internally received signals onto one or more radio frequency carrier waves and/or amplification circuitry to amplify internally received signals before transmission. RF transceiver 304 may provide such signals to antenna 302 for wireless transmission. Although not explicitly depicted in FIG. 3, RF transceiver 304 may be additionally be connected to application processor 308.

Figure 4:
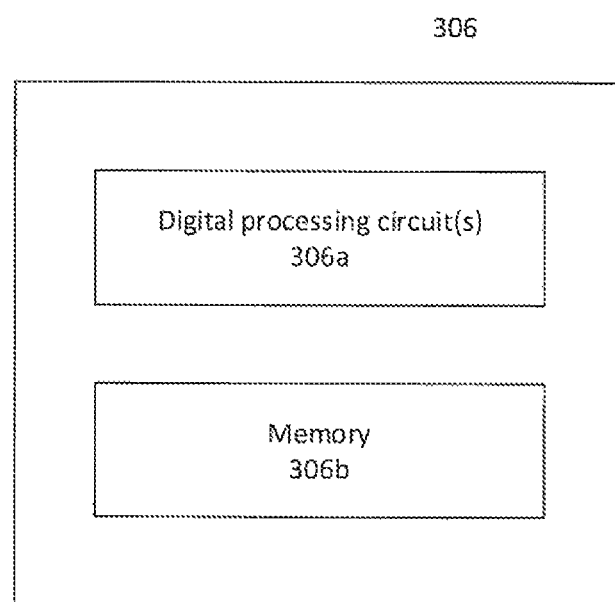
FIG. 4 shows an internal configuration of a baseband modem.

FIG. 4 shows a block diagram illustrating an internal configuration of baseband modem 306 according to an aspect of the disclosure. Baseband modem 306 may include digital processing circuit(s) 306a (i.e. one or more digital processing circuits) and baseband memory 306b. Although not explicitly shown in FIG. 4, baseband modem 306 may contain one or more additional components, including one or more analog circuits.

Digital processing circuit(s) 306a may be composed of various processing circuitry configured to perform baseband (herein also including "intermediate") frequency processing, such as Analog to Digital Converters (ADCs) and/or Digital to Analog Converters (DACs), modulation/demodulation circuitry, encoding/decoding circuitry, audio codec circuitry, digital signal processing circuitry, etc. Digital processing circuit(s) 306a may include hardware, software, or a combination of hardware and software. Specifically, digital processing circuit(s) 306a of baseband modem 306 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof. It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 306 may be detailed herein substantially in terms of functional operation in recognition that a person of skill in the art may readily appreciate the various possible structural realizations of baseband modem 306 using digital processing circuitry that will provide the desired functionality.

Baseband memory 306b may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. Baseband memory 306b may be configured to store software elements, which may be retrieved and executed using a processor component of digital processing circuitry 306a. Although depicted as a single component in FIG. 3, baseband memory 306b may be implemented as one or more separate components in baseband modem 306. Baseband memory 306b may also be partially or fully integrated with digital processing circuitry 306a.

Baseband modem 306 be configured to operate one or more protocol stacks, such as a GSM protocol stack, a UMTS protocol stack, an LTE protocol stack, etc. Baseband modem 306 may be "multimode" and may thus be configured to operate in accordance with multiple RATs by executing multiple protocol stack instances simultaneously. Digital processing circuitry 306a may therefore include a processor configured to execute program code in accordance with the protocol stacks of each associated RAT. Baseband memory 306a may be configured to store the aforementioned program code. Although not explicitly depicted in FIG. 3, baseband modem 306 may be configured to control one or more further components of UE 104 or 106, in particular one or more microphones and/or speakers, such as by providing output audio signals to one or more speakers and/or receiving input audio signals from one or more microphones.

The protocol stack(s) of baseband modem 306 may be configured to control operation of baseband modem 306, such as in order to transmit and receive mobile data in accordance with the corresponding RAT(s).

As will be detailed, baseband modem 306 may have digital processing circuitry (digital processing circuit 306a) and a memory (baseband memory 306b). Baseband modem 306 may be configured to identify a first set of frequency resources allocated for a wireless channel by a mobile communication network, calculate a first channel response estimate for a second set of frequency resources of the wireless channel using a reference signal derived from a mobile terminal device, wherein the reference signal is distributed across the second set of frequency resources of wireless channel, calculate a second channel response estimate for the first set of frequency resources of the wireless channel using the first channel response estimate, wherein the first set of frequency resources includes a greater bandwidth of the wireless channel than the second set of frequency resources, and apply the second channel response estimate to schedule data transmission intended for the mobile terminal device over the wireless channel.

Application processor 308 may be implemented as a Central Processing Unit (CPU), and may function as a controller for mobile terminal 104. Application processor 308 may be configured to execute various applications and/or programs of mobile terminal 104, such as e.g. applications corresponding to program code stored in a memory component of mobile terminal 104 (not explicitly shown in FIG. 3). Application processor 308 may also be configured to control one or more further components of mobile terminal 104, such as user input/output devices (display(s), keypad(s), touchscreen(s), speaker(s), external button(s), camera(s), microphone(s), etc.), peripheral devices, memory, power supply, external device interfaces, etc.

Although baseband modem 306 and application processor 308 are depicted separately in FIG. 3, it is appreciated that this illustration is not limiting in nature. Accordingly, it is understood that baseband modem 306 and application processor 308 may be implemented separately, implemented together (i.e. as an integrated unit), or partially implemented together.

Baseband modem 306 may substantially control the aforementioned sidelink channel response estimation procedure, such as by receiving signals from RF transceiver 302 and executing the sidelink channel response estimation procedure by processing the received signals, e.g. using digital signal processing circuit(s) 306a. Baseband modem 306 may perform the sidelink channel response estimation procedure in accordance with a protocol stack executed on digital processing circuit(s) 306a.

In order to calculate the sidelink channel response estimate for the entire sidelink bandwidth, baseband modem 306 may first need to estimate the channel frequency response of the reference signal bandwidth, i.e. the frequency range of the PSSS and SSSS sequence transmitted by the sink mobile terminal (as shown in FIG. 2). Baseband modem 306 may therefore perform a Fourier transform operation on the PSSS and/or SSSS sequence (based on e.g. a previously obtained time-frequency reference identifying the location of the PSSS and/or SSSS sequence within sidelink resource pool 204) received from the sink mobile terminal in order to calculate the reference signal channel frequency response using a timing reference point indicating the timing location of the PSSS and/or SSSS. Upon obtaining the reference signal channel frequency response, baseband modem 306 may apply the flat sidelink channel response assumption (i.e. due to relatively small multipath delay spread) in order to obtain the channel impulse response. Baseband modem 306 may then derive a sidelink channel frequency response estimate from the channel impulse response, thereby obtaining the channel frequency response for the entire sidelink bandwidth.

Figure 5:
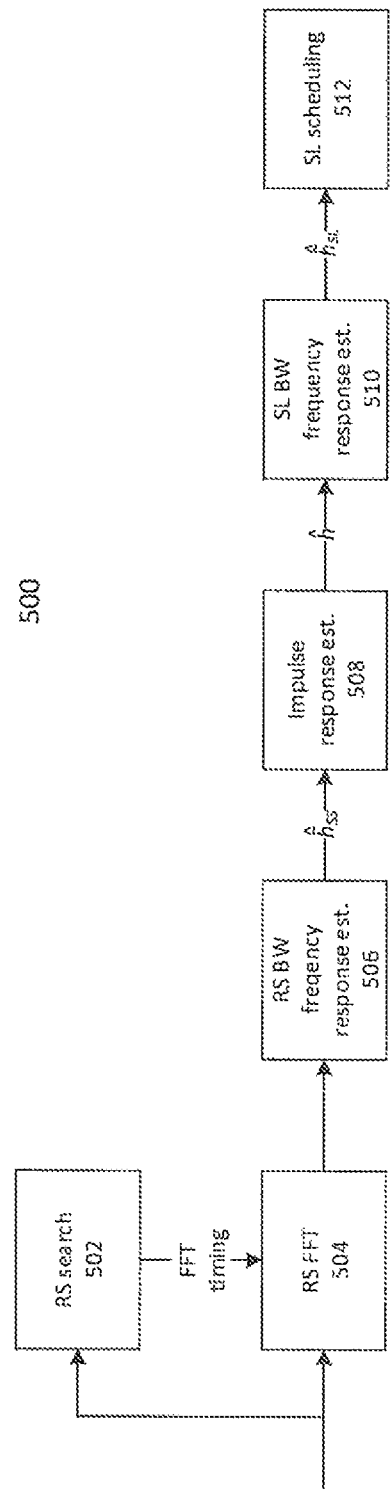
FIG. 5 shows a flow chart illustrating a procedure for obtaining a comprehensive channel response estimate for an entire sidelink frequency band using a limited-band sidelink reference signal.

FIG. 5 shows flow diagram 500 illustrating the sidelink channel response estimation procedure performed by digital processing circuit(s) 306a of baseband modem 306. Baseband modem 306 may perform the sidelink channel response estimation procedure of flow diagram 500 based on PSSS and/or SSSS received from a sink mobile terminal, such as e.g. mobile terminal 106, in order to obtain a sidelink channel response estimate for the wireless channel between UE 104 and the sink mobile terminal. Baseband modem 306 may then utilize the obtained sidelink channel response estimate in order to perform scheduling and transmission of ProSe data to the sink mobile terminal, such as link adaptation and wireless resource allocation.

In 502, baseband modem 306 may first detect PSSS and SSSS sequence(s) transmitted by proximate ProSe-enabled mobile terminals, which may be part of e.g. ProSe Discovery and/or ProSe Communication. As previously indicated, ProSe-enabled mobile terminals may transmit PSSS and SSSS in subsequent slots of synchronization subframes during ProSe operations. Accordingly, baseband modem 306 may detect the PSSS and SSSS transmitted by at least a sink mobile terminal by processing received signals, such as e.g. signals received by RF transceiver 304 using antenna 302 and provided to baseband modem 306. Similarly to PSS and SSS in conventional mobile communications, each of the possible PSSS and SSSS sequences may be known in advance. Accordingly, baseband modem 306 may correlate received signals with locally stored copies of the possible PSSS and SSSS sequences in order to detect the presence of PSSS and SSSS sequences in the received signals. Baseband modem 306 may therefore obtain a time-frequency reference within sidelink resource pool 204 corresponding to each detected PSSS and SSSS sequence, where the time reference indicates e.g. the strongest multipath.

Accordingly, assuming sink mobile terminal 106 is active, baseband modem 306 may detect a PSSS and SSSS sequence transmitted by sink mobile terminal 106 during a synchronization subframe, and accordingly may identify a time-frequency resource corresponding to the PSSS and SSSS sequences transmitted by sink mobile terminal 106, thereby obtaining time-frequency synchronization with sink mobile terminal 106. Baseband modem 306 may therefore obtain a timing reference point indicating the location of the PSSS and SSSS sequence transmitted by sink mobile terminal 106.

In 504, baseband modem 306 may utilize the PSSS/SSSS timing reference point in order to perform a Fast Fourier Transform (FFT) on the PSSS and/or SSSS, thereby obtaining a frequency domain PSSS and/or SSSS sequence. For example, baseband modem 306 may obtain a PSSS sequence time domain signal and/or an SSSS sequence time domain signal. Baseband modem 306 may then perform respective FFTs on the PSSS sequence time domain signal and the SSSS sequence time domain signal in order to obtain a frequency domain PSSS sequence and frequency domain SSSS sequence.

As previously indicated, the PSSS and SSSS sequences are known in advance. Accordingly, baseband modem 306 may apply this advance knowledge to derive a channel frequency response estimate over the reference signal bandwidth (e.g. the central 6 PRBs in an LTE network configuration) directly from the frequency domain representations of the PSSS and/or SSSS. Baseband modem 306 may therefore obtain reference signal channel frequency response estimate $\tilde{h}_{SS}$ in 506 based on the frequency domain representations of the received PSSS and/or SSSS sequences, where $\tilde{h}_{SS}$ is the sum of reference signal channel frequency response and any estimation errors.

It is appreciated that numerous procedures exist to calculate reference signal channel frequency response estimate $\tilde{h}_{SS}$ based on the frequency domain representations of the PSSS and/or SSSS sequence. For example, baseband modem 306 may calculate reference signal channel frequency response $\tilde{h}_{SS}$ based on only one of the PSSS or SSSS sequence. Alternatively, baseband modem 306 may calculate $\tilde{h}_{SS}$ by calculating a first channel frequency response estimate based on the PSSS sequence received from the sink mobile terminal and a second channel frequency response estimate based on the SSSS sequence. Baseband modem 306 may then linearly combine the first channel frequency response estimate and the second channel frequency response estimate, such as by weighting and summing the first channel frequency response and the second channel frequency response, e.g. using equivalent or different weights. Alternatively, baseband modem 306 may calculate a first channel frequency response estimate and a second channel frequency response estimate based on multiple respective PSSS and SSSS sequences received from the sink mobile terminal over a set time period. Baseband modem 306 may calculate a first group of channel frequency response estimates based on the multiple received PSSS sequences and a second group of channel frequency response estimates based on the multiple received SSSS sequences, and subsequently average the first group of channel frequency response estimates to obtain the first channel frequency response estimate and average the second group of channel frequency response estimates to obtain the second channel frequency response estimate. Baseband modem 306 may then combine the first channel frequency response estimate and the second channel frequency response estimate to obtain $\tilde{h}_{SS}$.

Baseband modem 306 may therefore obtain reference signal channel frequency response estimate $\tilde{h}_{SS}$ at 506, which may characterize the wireless channel of air interface 114 over the reference signal bandwidth of the PSSS and SSSS sequence transmitted by sink mobile terminal 106. Baseband modem 306 may then obtain channel impulse response estimate $\hat{h}$ in 506, which may be the channel impulse response (time-domain) at the resolution of receiver sampling. Baseband modem 306 may obtain channel impulse response estimate $\hat{h}$ based on reference signal channel frequency response estimate $\tilde{h}_{SS}$ using Minimum Mean Square Error (MMSE) estimation as follows $$\hat{h} = R_{hh} F_{SS}^H (F_{SS} R_{hh} F_{SS}^H + \sigma_{\tilde{h}_{SS}}^2 I_{72})^{-1} \tilde{h}_{SS} \qquad (1),$$

where $R_h$ is the channel covariance matrix, $F_{SS}$ is the partial FFT matrix corresponding to the reference signal bandwidth (i.e. the frequency band containing the PSSSS and SSSS), $\sigma_{\tilde{h}_{SS}}^2$ the estimate error variance of $\tilde{h}_{SS}$, $I_{72}$ is the 72×72 identity matrix, and $A^H$ indicates the Hermetian transpose of A.

As previously indicated, due to the relatively short propagation distance of ProSe transmissions between two mobile terminals, baseband modem 306 may rely on the assumption that the channel frequency response is relatively flat due to the associated small delay spread. Accordingly, baseband modem 306 may obtain channel impulse response estimate $\hat{h}$ from reference signal channel frequency response $\tilde{h}_{SS}$ using Equation 1 based on the underlying flat channel assumption.

It is appreciated that baseband modem 306 may utilize other estimation approaches to obtain channel impulse response estimate $\hat{h}$, such as Least Square (LS) estimation or Least Minimum Mean Square Error (LMMSE) estimation using a similar flat channel assumption.

Baseband modem 306 may thus obtain channel impulse response estimate $\hat{h}$ in 508, which may be an estimate of the channel impulse response in time (inherently limited by the receiver sampling resolution). Accordingly, baseband modem 306 may then apply a partial FFT operation on $\hat{h}$ to obtain sidelink channel frequency response estimate $\hat{h}_{SL}$ as follows $$\hat{h}_{SL} = F_{SL}h \quad (2),$$

where $F_{SL}$ is the partial FFT matrix corresponding to the range of frequency resources composing sidelink resource pool 204.

Accordingly, baseband modem 306 may obtain sidelink channel frequency response estimate $\hat{h}_{SL}$ at 508, which estimates the frequency response of the wireless channel between mobile terminal 104 and the sink mobile terminal (i.e. mobile terminal 106) over the entire sidelink bandwidth. Due to channel reciprocity, baseband modem 306 may then utilize sidelink channel frequency response estimate $\hat{h}_{SL}$ in order to perform sidelink scheduling in 512, such as by identifying frequency resources to utilize for transmitting ProSe data to the sink mobile terminal and/or performing link adaptation.

Specifically, baseband modem 306 may evaluate sidelink channel frequency response estimate $\hat{h}_{SL}$ in order to identify frequency resources of sidelink resource pool 204 having high Signal-to-Noise Ratio (SNR), and subsequently allocate the identified frequency resources for transmission of ProSe data. Baseband modem 306 may therefore prepare and send a Scheduling Assignment (SA) message to the sink mobile terminal, e.g. using the PSCCH over air interface 114, where the SA message indicates the identified frequency resources in addition to timing resources. Baseband modem 306 may then prepare and transmit the ProSe data to the sink mobile terminal using the time-frequency resources specified in the SA message.

The following definitions may be relevant to Equation 1
$W_{UL}$ Uplink bandwidth in terms of PRBs
$W_{SL}$ Sidelink bandwidth in terms of PRBs
L Length of channel impulse response
$\tilde{h}_{UL} \in C^{12W_{UL}}$ Channel frequency response over complete uplink bandwidth
$\tilde{h}_{SL} \in C^{12W_{UL}}$ Channel frequency response over complete sidelink bandwidth
$\tilde{h}_{SS} \in C^{72}$ Channel frequency response over the reference signal bandwidth
$h \in C^L$ Channel impulse response at receiver sampling resolution
$F \in C^{12W_{UL} \times 12W_{UL}}$ FFT matrix for complete uplink bandwidth $F_L \in C^{12W_{UL} \times L}$ FFT matrix consisting of first L columns of F
$F_{SL} \in C^{12W_{SL} \times L}$ FFT matrix consisting of first $12W_{SL}$ rows of $F_L$
$F_{SS} \in C^{72 \times L}$ FFT matrix consisting of the central 72 rows of $F_{SL}$ The following relationships may thus be derived based on the above definitions $$\tilde{h}_{UL} = (\ldots, \tilde{h}_{SL}^T, \ldots)^T \quad (3).$$

$$\tilde{h}_{SL} = (\ldots, \tilde{h}_{SS}^T, \ldots)^T \quad (4).$$

$$\tilde{h}_{UL} = Fh \quad (5).$$

Figure 6:
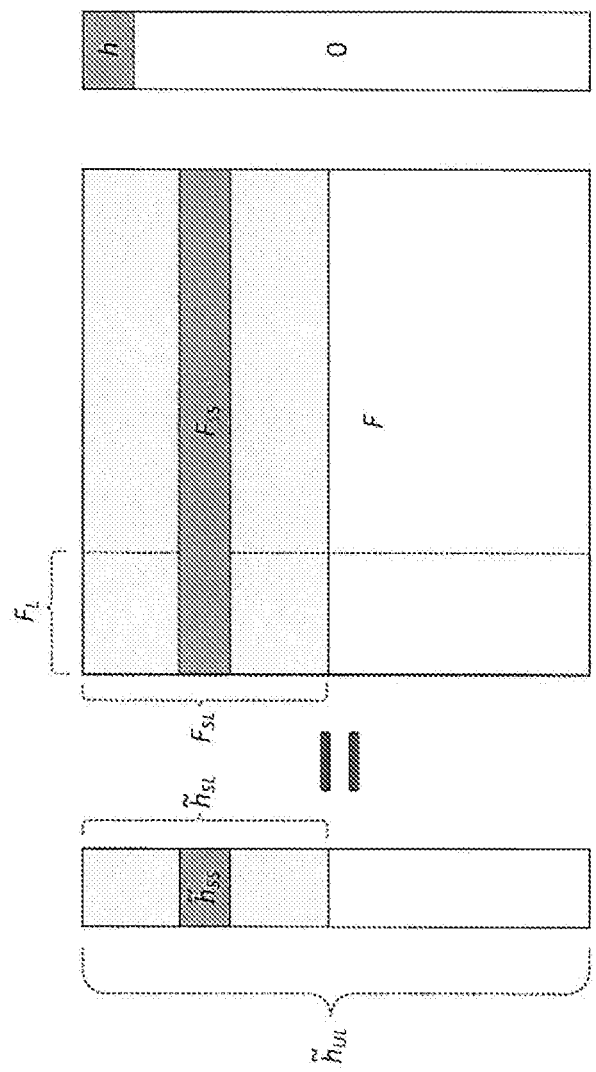
FIG. 6 shows a matrix system illustrating a discrete Fourier transform over various frequency bands.

Corresponding to Equation 4, the relationships between channel impulse response vectors (time domain), channel frequency response vectors (frequency domain), and FFT matrices may be illustrated as shown in FIG. 6.

Expanding on FIG. 6 and Equations 3-5, sidelink channel frequency response $\tilde{h}_{SL}$ and reference signal channel frequency response $\tilde{h}_{SS}$ may be denoted using partial sidelink FFT matrix $F_{SL}$ and partial reference signal FFT matrix $F_{SS}$, respectively, as follows $$\tilde{h}_{SL} = F_{SL}h \quad (6).$$

$$\tilde{h}_{SS} = F_{SS}h \quad (7).$$

Figure 7:
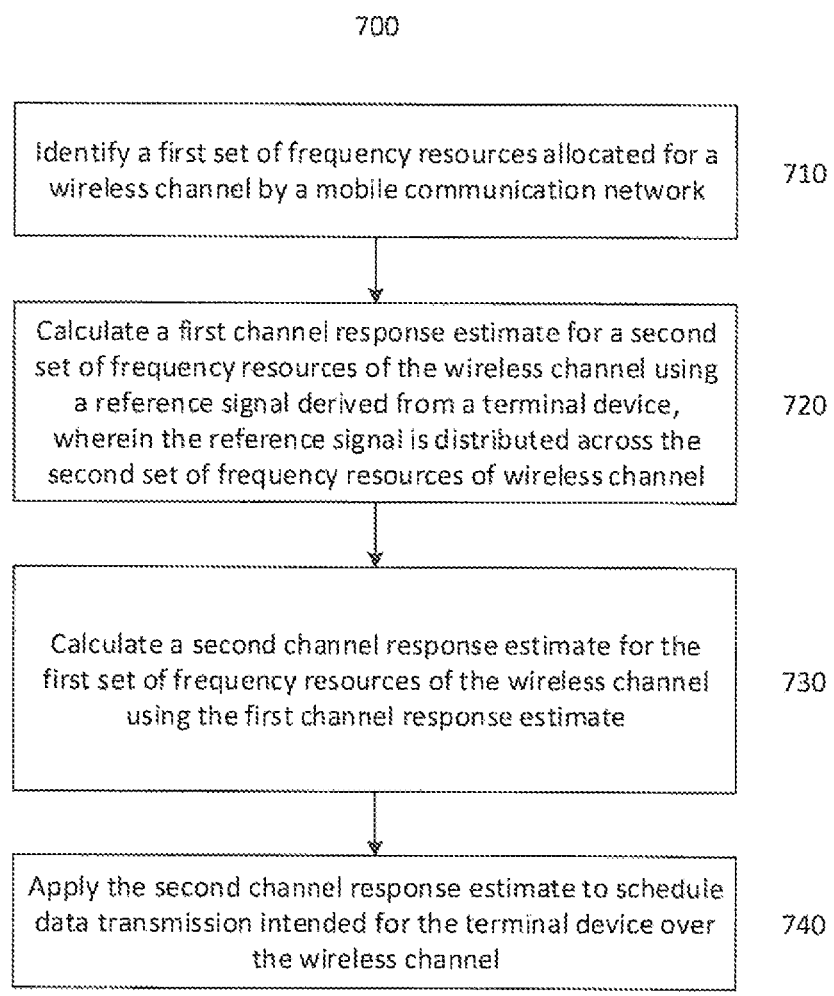
FIG. 7 shows a method of performing communications according to an exemplary aspect of the disclosure.

It is appreciated that while the above Equations may assume a reference signal bandwidth of 72 subcarriers, e.g. in PSSS and SSSS sequences in accordance with an LTE network configuration, further FIG. 7 shows a flow chart illustrating method 700 for performing communications. Method 700 may identify (710) a first set of frequency resources allocated for a wireless channel by a mobile communication network. Method 700 may calculate (720) a first channel response estimate for a second set of frequency resources of the wireless channel using a reference signal derived from a terminal device, wherein the reference signal is distributed across the second set of frequency resources of wireless channel. Method 700 may calculate (730) a second channel response estimate for the first set of frequency resources of the wireless channel using the first channel response estimate. The first set of frequency resources may have a greater bandwidth of the wireless channel than the second set of frequency resources. Method 700 may apply (740) the second channel response estimate to schedule data transmission intended for the terminal device over the wireless channel.

In one or more further exemplary aspects of the disclosure, one or more of the features described above in reference to FIGS. 1-6 may be further incorporated into method 700. In particular, method 700 may be configured to perform further and/or alternate processes as detailed regarding mobile terminal 104 and baseband modem 306.

Figure 8:
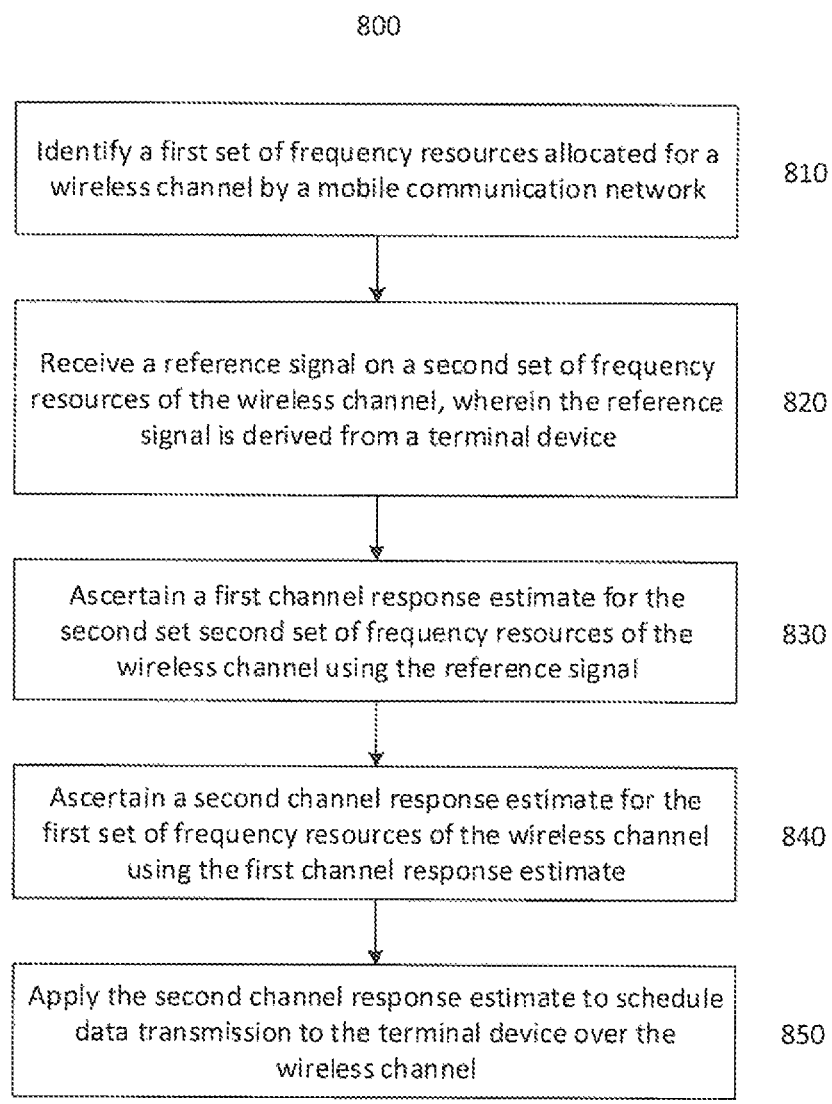
FIG. 8 shows a method of performing communications according to a further exemplary aspect of the disclosure.

FIG. 8 shows a flow chart illustrating method 800 for performing communications. Method 800 may identify (810) a first set of frequency resources allocated for a wireless channel by a mobile communication network. Method 800 may receive (820) a reference signal on a second set of frequency resources of the wireless channel, wherein the reference signal is derived from a terminal device. The first set of frequency resources may have a greater bandwidth than the second set of frequency resources. Method 800 may ascertain (830) a first channel response estimate for the second set second set of frequency resources of the wireless channel using the reference signal. Method 800 may ascertain (840) a second channel response estimate for the first set of frequency resources of the wireless channel using the first channel response estimate. Method 800 may apply (850) the second channel response estimate to schedule data transmission to the terminal device over the wireless channel.

In one or more further exemplary aspects of the disclosure, one or more of the features described above in reference to FIGS. 1-6 may be further incorporated into method 800. In particular, method 800 may be configured to perform further and/or alternate processes as detailed regarding mobile terminal 104 and baseband modem 306.

Accordingly, a source ProSe-enabled mobile terminal may be able to utilize reference signals received from a sink ProSe-enabled mobile terminal with limited bandwidth compared to the sidelink resource pool in order to obtain a channel response estimate that accurately characterizes a wireless channel between the ProSe-enabled mobile terminals over the entire bandwidth of the sidelink resource pool. The source ProSe-enabled mobile terminal may then utilize the channel response estimate to manage ProSe operations with the sink ProSe enabled terminal, such as by selecting a set of frequency resources having strong channel conditions according to the channel response estimate to transmit ProSe data and/or by selecting a modulation scheme and/or coding rate for ProSe data transmission set of frequency resources based on the channel conditions indicated by the channel response estimate.

As utilized herein, the terms "user equipment", "UE", and "mobile terminal", etc., may refer to any device capable of mobile communications over a mobile communication network, and thus may not be limited to cellular telephones.

It is understood that that the above description is considered demonstrative in nature, and thus may be expanded to a variety of applications in addition to the ProSe-specific exemplary scenarios detailed herein. Specifically, it is appreciated that while the above description may specifically refer to the use of PSSS and/or SSSS sequences to derive a channel response estimate for the entire sidelink bandwidth, many other scenarios may occur where such an approach is relevant. For example, other reference signals provided for ProSe, such as reference signals introduced by 3GPP at a later time, may be similarly utilized to derive a channel response estimate for the entire sidelink bandwidth. Furthermore, it is appreciated that above description may be applicable in other non-ProSe scenarios, such as other scenarios in which a flat channel frequency response may be assumed, e.g. due to small delay spread. Furthermore, it is appreciated that the implementation detailed above may be realized even in scenarios in which a provided reference signal is distributed across the entire sidelink and/or system bandwidth. For example, a subsection of the bandwidth of a reference signal may be selected to derive a channel response estimate for the entire sidelink and/or system bandwidth, such as relying on a similar flat channel assumption. As opposed to utilizing the entire bandwidth of the reference signal, use of only a specific sub-band of the reference signal bandwidth to estimate the channel frequency response may reduce processing power requirements while still providing a comprehensive channel frequency response estimate due to the largely flat channel frequency response.

The following examples pertain to further aspects of the disclosure:

Example 1 is a method of performing communications. The method includes identifying a first set of frequency resources allocated for a wireless channel by a mobile communication network, calculating a first channel response estimate for a second set of frequency resources of the wireless channel using a reference signal derived from a terminal device, wherein the reference signal is distributed across the second set of frequency resources of the wireless channel, calculating a second channel response estimate for the first set of frequency resources of the wireless channel using the first channel response estimate, wherein the first set of frequency resources has a greater bandwidth of the wireless channel than the second set of frequency resources, and applying the second channel response estimate to schedule data transmission intended for the terminal device over the wireless channel.

In Example 2, the subject matter of Example 1 can optionally include wherein the first set of frequency resources has a greater bandwidth of the wireless channel than the second set of frequency resources.

In Example 3, the subject matter of Example 1 or 2 can optionally include wherein applying the second channel response estimate to schedule data transmission intended for the terminal device over the wireless channel further includes performing one of frequency resource selection, modulation scheme selection, or coding rate selection based on the second channel response estimate.

In Example 4, the subject matter of Example 1 or 2 can optionally further include transmitting a scheduling message intended for the terminal device over the wireless channel indicating a third set of frequency resources for data transmission.

In Example 5, the subject matter of Example 4 can optionally further include transmitting data intended for the terminal device over the wireless channel using the third set of frequency resources.

In Example 6, the subject matter of Example 4 can optionally include wherein applying the second channel response estimate to schedule data transmission intended for the terminal device over the wireless channel further includes selecting the third set of frequency resources using the second channel response estimate.

In Example 7, the subject matter of Example 1 or 2 can optionally further include transmitting a scheduling message intended for the terminal device over the wireless channel indicating a modulation scheme for data transmission.

In Example 8, the subject matter of Example 7 can optionally further include transmitting data intended for the terminal device over the wireless channel using the modulation scheme.

In Example 9, the subject matter of Example 1 or 2 can optionally further include transmitting a scheduling message intended for the terminal device over the wireless channel indicating a coding rate for data transmission.

In Example 10, the subject matter of Example 9 can optionally further include transmitting data intended for the terminal device over the wireless channel using the coding rate.

In Example 11, the subject matter of any one of Examples 1 to 10 can optionally include wherein the second channel response estimate approximates the frequency response of the wireless channel over the first set of frequency resources.

In Example 12, the subject matter of any one of Examples 1 to 11 can optionally include wherein the first set of frequency resources is a set of subcarriers allocated by the mobile communication network for Proximity Services (ProSe).

In Example 13, the subject matter of Example 1 or 2 can optionally include wherein applying the second channel response estimate to schedule data transmission intended for the terminal device over the wireless channel further includes selecting a third set of frequency resources of the wireless channel using the second channel response estimate, and transmitting data intended for the terminal device over the wireless channel using the third set of frequency resources.

In Example 14, the subject matter of Example 13 can optionally include wherein selecting the third set of frequency resources of the wireless channel using the second channel response estimate further includes identifying one or more frequency resources of the first set of frequency resources of the wireless channel that have strong channel conditions according to the second channel response estimate, and selecting the one or more frequency resources as the third set of frequency resources.

In Example 15, the subject matter of Example 13 can optionally include wherein the third set of frequency resources are a subset of the first set of frequency resources.

In Example 16, the subject matter of any one of Examples 1 to 15 can optionally include wherein the first channel response estimate is a channel frequency response estimate approximating the frequency response of the wireless channel over the second set of frequency resources, and wherein calculating the first channel response estimate for the second set of frequency resources of the wireless channel using the reference signal derived from the terminal device further includes calculating a frequency domain representation of the reference signal, and calculating the first channel response estimate using the frequency domain representation of the reference signal.

In Example 17, the subject matter of Example 16 can optionally include wherein calculating the frequency domain representation of the reference signal includes applying a Fast Fourier Transform to the reference signal to calculate the frequency domain representation of the reference signal.

In Example 18, the subject matter of Example 1 or 2 can optionally include wherein the first channel response estimate is a first channel frequency response estimate approximating the frequency response of the wireless channel over the second set of frequency resources and the second channel response estimate is a second channel frequency response estimate approximating the frequency response of the wireless channel over the first set of frequency resources, and wherein calculating the second channel response estimate for the first set of frequency resources of the wireless channel using the first channel response estimate further includes calculating a channel impulse response estimate for the wireless channel using the first channel frequency response estimate, and calculating the second channel frequency response estimate using the channel impulse response.

In Example 19, the subject matter of Example 1 or 2 can optionally include wherein calculating the second channel response estimate for the first set of frequency resources of the wireless channel using the first channel response estimate further includes calculating a channel impulse response estimate for the wireless channel using the first channel response estimate, and calculating the second channel response estimate as a channel frequency response estimate of the wireless channel over the first set of frequency resources using the channel impulse response estimate.

In Example 20, the subject matter of Example 19 can optionally include wherein the first channel response estimate and the second channel response estimate are channel frequency response estimates of the wireless channel.

In Example 21, the subject matter of Example 19 can optionally include wherein the first channel response estimate approximates the channel frequency response of the wireless channel over the second set of frequency resources and the second channel response estimate approximates the channel frequency response of the wireless channel over the first set of frequency resources.

In Example 22, the subject matter of Example 19 can optionally include wherein calculating the channel impulse response estimate for the wireless channel using the first channel response estimate includes applying at least one of least squares (LS) estimation, minimum mean square error (MMSE) estimation (MMSE), or linear minimum mean square error (LMMSE) estimation to the first channel response estimate to calculate the channel response estimate.

In Example 23, the subject matter of Example 19 can optionally include wherein calculating the second channel response estimate as the channel frequency response estimate of the wireless channel over the first set of frequency resources using the channel impulse response estimate includes applying a Fourier transform to the channel impulse response estimate to calculate the second channel response estimate.

In Example 24, the subject matter of Example 23 can optionally include wherein applying the Fourier transform to the channel impulse response estimate to obtain the second channel response estimate includes applying a Fast Fourier Transform (FFT) to the channel impulse response estimate to calculate the second channel response estimate.

In Example 25, the subject matter of Example 24 can optionally include wherein applying the Fast Fourier Transform (FFT) to the channel impulse response estimate to obtain the second channel response estimate includes applying a partial Fast Fourier Transform (FFT) matrix corresponding to the first set of frequency resources to the channel impulse response estimate to calculate the second channel response estimate.

In Example 26, the subject matter of any one of Examples 1 to 25 can optionally include wherein the first channel response estimate is a channel frequency response estimate approximating the frequency response of the wireless channel over the second set of frequency resources.

In Example 27, the subject matter of any one of Examples 1 to 26 can optionally include wherein the second channel response estimate is a channel frequency response estimate approximating the frequency response of the wireless channel over the first set of frequency resources.

In Example 28, the subject matter of any one of Examples 1 to 27 can optionally include wherein the first set of frequency resources is a first set of one or more subcarriers an the second set of frequency resources is a second set of one or more subcarriers.

In Example 29, the subject matter of Example 28 can optionally further include receiving the reference signal from the terminal device over the wireless channel on the second set of one or more subcarriers.

In Example 30, the subject matter of Example 28 can optionally include wherein the second set of one or more subcarriers is a subset of the first set of one or more subcarriers.

In Example 31, the subject matter of Example 1 or 2 can optionally include wherein calculating the first channel response estimate for the second set of frequency resources of the wireless channel using the reference signal derived from the terminal device further includes calculating a frequency domain representation of the reference signal, and calculating the first channel response estimate using the frequency domain representation of the reference signal.

In Example 32, the subject matter of any one of Examples 1 to 31 can optionally further include receiving system information from the mobile communication network indicating that the first set of frequency resources are allocated for the wireless channel.

In Example 33, the subject matter of any one of Examples 1 to 32 can optionally include wherein the first set of frequency resources are a subset of frequency resources allocated by the mobile communication network for uplink mobile communications.

In Example 34, the subject matter of any one of Examples 1 to 33 can optionally further include receiving the reference signal from the terminal device over the wireless channel.

In Example 35, the subject matter of Example 34 can optionally include wherein receiving the reference signal from the terminal device over the wireless channel includes receiving the reference signal on the second set of frequency resources of the wireless channel.

In Example 36, the subject matter of Example 35 can optionally include wherein the second set of frequency resources is a subset of the first set of frequency resources.

In Example 37, the subject matter of any one of Examples 1 to 36 can optionally include wherein the wireless channel is a Proximity Services (ProSe) link with the terminal device.

In Example 38, the subject matter of any one of Examples 1 to 37 can optionally include wherein the reference signal is a Primary Sidelink Synchronization Signal (PSSS) or a Secondary Sidelink Synchronization Signal (SSSS).

In Example 39, the subject matter of any one of Examples 1 to 38 can optionally include wherein the first set of frequency resources include a first set of subcarriers and the second set of frequency resources include a second set of subcarriers.

In Example 40, the subject matter of any one of Examples 1 to 39 can optionally include wherein the second set of frequency resources are a subset of the first set of frequency resources.

In Example 41, the subject matter of any one of Examples 1 to 40 can optionally further include receiving the reference signal from the terminal device on the second set of frequency resources of the wireless channel, wherein the second set of frequency resources is a subset of the first set of frequency resources.

In Example 42, the subject matter of any one of Examples 1 to 41 can optionally include wherein the wireless channel is a device-to-device wireless channel.

Example 43 is a mobile terminal device having a radio processing circuit and a baseband processing circuit adapted to interact with the radio processing circuit, wherein the mobile terminal device is configured to perform the method of any one of claims 1 to 42.

Example 44 is a mobile baseband modem including one or more digital processing circuits, the mobile baseband modem configured to perform the method of any one of claims 1 to 42.

Example 45 is an electronic circuit configured to perform the method of any one of claims 1 to 42.

Example 46 is a method of performing communications. The method includes identifying a first set of frequency resources allocated for a wireless channel by a mobile communication network, receiving a reference signal based on a second set of frequency resources of the wireless channel, wherein the reference signal is derived from a terminal device, ascertaining a first channel response estimate for the second set second set of frequency resources of the wireless channel using the reference signal, ascertaining a second channel response estimate for the first set of frequency resources of the wireless channel using the first channel response estimate, and applying the second channel response estimate to schedule data transmission to the terminal device over the wireless channel.

In Example 47, the subject matter of Example 46 can optionally include wherein the first set of frequency resources has a greater bandwidth than the second set of frequency resources In Example 48, the subject matter of Example 46 or 47 can optionally include wherein applying the second channel response estimate to schedule data transmission to the terminal device over the wireless channel further includes performing one of frequency resource selection, modulation scheme selection, or coding rate selection based on the second channel response estimate.

In Example 49, the subject matter of Example 46 or 47 can optionally further include transmitting a scheduling message intended for the terminal device over the wireless channel indicating a third set of frequency resources for data transmission.

In Example 50, the subject matter of Example 49 can optionally further include transmitting data intended for the terminal device over the wireless channel using the third set of frequency resources.

In Example 51, the subject matter of Example 49 can optionally include wherein applying the second channel response estimate to schedule data transmission intended for the terminal device over the wireless channel further including selecting the third set of frequency resources using the second channel response estimate.

In Example 52, the subject matter of Example 46 or 47 can optionally further include transmitting a scheduling message intended for the terminal device over the wireless channel indicating a modulation scheme for data transmission.

In Example 53, the subject matter of Example 52 can optionally further include transmitting data intended for the terminal device over the wireless channel using the modulation scheme.

In Example 54, the subject matter of Example 46 or 47 can optionally further include transmitting a scheduling message intended for the terminal device over the wireless channel indicating a coding rate for data transmission.

In Example 55, the subject matter of Example 54 can optionally further include transmitting data intended for the terminal device over the wireless channel using the coding rate.

In Example 56, the subject matter of any one of Examples 46 to 55 can optionally include wherein the second channel response estimate approximates the frequency response of the wireless channel over the first set of frequency resources.

In Example 57, the subject matter of any one of Examples 46 to 56 can optionally include wherein the first set of frequency resources is a set of subcarriers allocated by the mobile communication network for Proximity Services (ProSe).

In Example 58, the subject matter of Example 46 or 47 can optionally include wherein applying the second channel response estimate to schedule data transmission intended for the terminal device over the wireless channel includes selecting a third set of frequency resources of the wireless channel using the second channel response estimate, and transmitting data intended for the terminal device over the wireless channel using the third set of frequency resources.

In Example 59, the subject matter of Example 58 can optionally include wherein selecting the third set of frequency resources of the wireless channel using the second channel response estimate includes identifying one or more frequency resources of the first set of frequency resources of the wireless channel that have strong channel conditions according to the second channel response estimate, and selecting the one or more frequency resources as the third set of frequency resources.

In Example 60, the subject matter of Example 58 can optionally include wherein the third set of frequency resources are a subset of the first set of frequency resources.

In Example 61, the subject matter of any one of Examples 46 to 60 can optionally include wherein the first channel response estimate is a channel frequency response estimate approximating the frequency response of the wireless channel over the second set of frequency resources, and wherein ascertaining the first channel response estimate for the second set of frequency resources of the wireless channel using the reference signal derived from the terminal device includes calculating a frequency domain representation of the reference signal, and calculating the first channel response estimate using the frequency domain representation of the reference signal.

In Example 62, the subject matter of Example 61 can optionally include wherein ascertaining the frequency domain representation of the reference signal includes applying a Fast Fourier Transform to the reference signal to calculate the frequency domain representation of the reference signal.

In Example 63, the subject matter of Example 46 or 47 can optionally include wherein the first channel response estimate is a first channel frequency response estimate approximating the frequency response of the wireless channel over the second set of frequency resources and the second channel response estimate is a second channel frequency response estimate approximating the frequency response of the wireless channel over the first set of frequency resources, and wherein ascertaining the second channel response estimate for the first set of frequency resources of the wireless channel using the first channel response estimate includes calculating a channel impulse response estimate for the wireless channel using the first channel frequency response estimate, and calculating the second channel frequency response estimate using the channel impulse response.

In Example 64, the subject matter of Example 46 or 47 can optionally include wherein ascertaining the second channel response estimate for the first set of frequency resources of the wireless channel using the first channel response estimate includes calculating a channel impulse response estimate for the wireless channel using the first channel response estimate, and calculating the second channel response estimate as a channel frequency response estimate of the wireless channel over the first set of frequency resources using the channel impulse response estimate.

In Example 65, the subject matter of Example 64 can optionally include wherein the first channel response estimate and the second channel response estimate are channel frequency response estimates of the wireless channel.

In Example 66, the subject matter of Example 64 can optionally include wherein the first channel response estimate approximates the channel frequency response of the wireless channel over the second set of frequency resources and the second channel response estimate approximates the channel frequency response of the wireless channel over the first set of frequency resources.

In Example 67, the subject matter of Example 64 can optionally include wherein ascertaining the channel impulse response estimate for the wireless channel using the first channel response estimate includes applying at least one of least squares (LS) estimation, minimum mean square error (MMSE) estimation (MMSE), or linear minimum mean square error (LMMSE) estimation to the first channel response estimate to calculate the channel response estimate.

In Example 68, the subject matter of Example 64 can optionally include wherein ascertaining the second channel response estimate as the channel frequency response estimate of the wireless channel over the first set of frequency resources using the channel impulse response estimate includes applying a Fourier transform to the channel impulse response estimate to calculate the second channel response estimate.

In Example 69, the subject matter of Example 68 can optionally include wherein applying the Fast Fourier Transform (FFT) to the channel impulse response estimate to obtain the second channel response estimate includes applying a partial Fast Fourier Transform (FFT) matrix corresponding to the first set of frequency resources to the channel impulse response estimate to calculate the second channel response estimate.

In Example 70, the subject matter of any one of Examples 46 to 69 can optionally include wherein the first channel response estimate is a channel frequency response estimate approximating the frequency response of the wireless channel over the second set of frequency resources.

In Example 71, the subject matter of any one of Examples 46 to 70 can optionally include wherein the first channel response estimate is a channel frequency response estimate approximating the frequency response of the wireless channel over the second set of frequency resources.

In Example 72, the subject matter of any one of Examples 46 to 71 can optionally include wherein the second channel response estimate is a channel frequency response estimate approximating the frequency response of the wireless channel over the first set of frequency resources.

In Example 73, the subject matter of any one of Examples 46 to 72 can optionally include wherein the first set of frequency resources is a first set of one or more subcarriers an the second set of frequency resources is a second set of one or more subcarriers.

In Example 74, the subject matter of Example 73 can optionally include wherein receiving the reference signal on the second set of frequency resources of the wireless channel includes receiving the reference signal from the terminal device over the wireless channel on the second set of one or more subcarriers.

In Example 75, the subject matter of Example 73 can optionally include wherein the second set of one or more subcarriers is a subset of the first set of one or more subcarriers.

In Example 76, the subject matter of Example 46 or 47 can optionally include wherein ascertaining the first channel response estimate for the second set of frequency resources of the wireless channel using the reference signal derived from the terminal device includes calculating a frequency domain representation of the reference signal, and calculating the first channel response estimate using the frequency domain representation of the reference signal.

In Example 77, the subject matter of any one of Examples 46 to 76 can optionally further include receiving system information from the mobile communication network indicating that the first set of frequency resources are allocated for the wireless channel.

In Example 78, the subject matter of any one of Examples 46 to 77 can optionally include wherein the first set of frequency resources are a subset of frequency resources allocated by the mobile communication network for uplink mobile communications.

In Example 79, the subject matter of any one of Examples 46 to 78 can optionally include wherein the wireless channel is a Proximity Services (ProSe) link with the terminal device.

In Example 80, the subject matter of any one of Examples 46 to 79 can optionally include wherein the first set of frequency resources include a first set of subcarriers and the second set of frequency resources include a second set of subcarriers.

In Example 81, the subject matter of any one of Examples 46 to 80 can optionally include wherein the second set of frequency resources are a subset of the first set of frequency resources.

In Example 82, the subject matter of any one of Examples 46 to 81 can optionally include wherein the wireless channel is a device-to-device wireless channel.

Example 83 is a mobile terminal device having a radio processing circuit and a baseband processing circuit adapted to interact with the radio processing circuit, wherein the mobile terminal device is configured to perform the method of any one of Examples 46 to 82.

Example 84 is a mobile baseband modem including one or more digital processing circuits, the mobile baseband modem configured to perform the method of any one of Examples 46 to 82.

Example 85 is an electronic circuit configured to perform the method of any one of Examples 46 to 82.

Example 86 is a mobile terminal device having a radio processing circuit and a baseband processing circuit adapted to interact with the radio processing circuit. The mobile terminal device configured to identify a first set of frequency resources allocated for a wireless channel by a mobile communication network, calculate a first channel response estimate for a second set of frequency resources of the wireless channel using a reference signal derived from a second mobile terminal device, wherein the reference signal is distributed across the second set of frequency resources of the wireless channel, calculate a second channel response estimate for the first set of frequency resources of the wireless channel using the first channel response estimate, and apply the second channel response estimate to schedule data transmission intended for the second mobile terminal device over the wireless channel.

In Example 87, the subject matter of Example 86 can optionally include wherein the first set of frequency resources has a greater bandwidth of the wireless channel than the second set of frequency resources.

In Example 88, the subject matter of Example 86 or 87 can optionally include wherein applying the second channel response estimate to schedule data transmission intended for the second terminal device over the wireless channel includes performing one of frequency resource selection, modulation scheme selection, or coding rate selection based on the second channel response estimate.

In Example 89, the subject matter of Example 86 or 87 can optionally be further configured to transmit a scheduling message intended for the second mobile terminal device over the wireless channel indicating a third set of frequency resources for data transmission.

In Example 90, the subject matter of Example 89 can optionally be further configured to transmit data intended for the second mobile terminal device over the wireless channel using the third set of frequency resources.

In Example 91, the subject matter of Example 89 can optionally include wherein applying the second channel response estimate to schedule data transmission intended for the second mobile terminal device over the wireless channel further includes selecting the third set of frequency resources using the second channel response estimate.

In Example 92, the subject matter of Example 86 or 87 can optionally be further configured to transmit a scheduling message intended for the second mobile terminal device over the wireless channel indicating a modulation scheme for data transmission.

In Example 93, the subject matter of Example 92 can optionally be further configured to transmit data intended for the second mobile terminal device over the wireless channel using the modulation scheme.

In Example 94, the subject matter of Example 86 can optionally be further configured to transmit a scheduling message intended for the second mobile terminal device over the wireless channel indicating a coding rate for data transmission.

In Example 95, the subject matter of Example 94 can optionally be further configured to transmit data intended for the second mobile terminal device over the wireless channel using the coding rate.

In Example 96, the subject matter of any one of Examples 86 to 95 can optionally include wherein the second channel response estimate approximates the frequency response of the wireless channel over the first set of frequency resources.

In Example 97, the subject matter of any one of Examples 86 to 96 can optionally include wherein the first set of frequency resources is a set of subcarriers allocated by the mobile communication network for Proximity Services (ProSe).

In Example 98, the subject matter of Example 86 or 87 can optionally include wherein applying the second channel response estimate to schedule data transmission intended for the second mobile terminal device over the wireless channel includes selecting a third set of frequency resources of the wireless channel using the second channel response estimate, and transmitting data intended for the second mobile terminal device over the wireless channel using the third set of frequency resources.

In Example 99, the subject matter of Example 98 can optionally include wherein selecting the third set of frequency resources of the wireless channel using the second channel response estimate includes identifying one or more frequency resources of the first set of frequency resources of the wireless channel that have strong channel conditions according to the second channel response estimate, and selecting the one or more frequency resources as the third set of frequency resources.

In Example 100, the subject matter of Example 99 can optionally include wherein the third set of frequency resources are a subset of the first set of frequency resources.

In Example 101, the subject matter of any one of Examples 86 to 100 can optionally include wherein the first channel response estimate is a channel frequency response estimate approximating the frequency response of the wireless channel over the second set of frequency resources, and wherein calculating the first channel response estimate for the second set of frequency resources of the wireless channel using the reference signal derived from the second mobile terminal device includes calculating a frequency domain representation of the reference signal, and calculating the first channel response estimate using the frequency domain representation of the reference signal.

In Example 102, the subject matter of Example 101 can optionally include wherein calculating the frequency domain representation of the reference signal includes applying a Fast Fourier Transform to the reference signal to calculate the frequency domain representation of the reference signal.

In Example 103, the subject matter of Example 86 or 87 can optionally include wherein calculating the second channel response estimate for the first set of frequency resources of the wireless channel using the first channel response estimate includes calculating a channel impulse response estimate for the wireless channel using the first channel response estimate, and calculating the second channel response estimate as a channel frequency response estimate of the wireless channel over the first set of frequency resources using the channel impulse response estimate.

In Example 104, the subject matter of Example 86 or 87 can optionally include wherein the first channel response estimate is a first channel frequency response estimate approximating the frequency response of the wireless channel over the second set of frequency resources and the second channel response estimate is a second channel frequency response estimate approximating the frequency response of the wireless channel over the first set of frequency resources, and wherein calculating the second channel response estimate for the first set of frequency resources of the wireless channel using the first channel response estimate includes calculating a channel impulse response estimate for the wireless channel using the first channel frequency response estimate, and calculating the second channel frequency response estimate using the channel impulse response.

In Example 105, the subject matter of Example 104 can optionally include wherein the first channel response estimate and the second channel response estimate are channel frequency response estimates of the wireless channel.

In Example 106, the subject matter of Example 104 can optionally include wherein the first channel response estimate approximates the channel frequency response of the wireless channel over the second set of frequency resources and the second channel response estimate approximates the channel frequency response of the wireless channel over the first set of frequency resources.

In Example 107, the subject matter of Example 104 can optionally include wherein calculating the channel response estimate for the wireless channel using the first channel response estimate includes applying at least one of least squares (LS) estimation, minimum mean square error (MMSE) estimation (MMSE), or linear minimum mean square error (LMMSE) estimation to the first channel response estimate to calculate the channel response estimate.

In Example 108, the subject matter of Example 104 can optionally include wherein calculating the second channel response estimate as the channel frequency response estimate of the wireless channel over the first set of frequency resources using the channel impulse response estimate includes applying a Fourier transform to the channel impulse response estimate to calculate the second channel response estimate.

In Example 109, the subject matter of Example 108 can optionally include wherein applying the Fourier transform to the channel impulse response estimate to obtain the second channel response estimate includes applying a Fast Fourier Transform (FFT) to the channel impulse response estimate to calculate the second channel response estimate.

In Example 110, the subject matter of Example 109 can optionally include wherein applying the Fast Fourier Transform (FFT) to the channel impulse response estimate to obtain the second channel response estimate includes applying a partial Fast Fourier Transform (FFT) matrix corresponding to the first set of frequency resources to the channel impulse response estimate to calculate the second channel response estimate.

In Example 111, the subject matter of any one of Examples 86 to 110 can optionally include wherein the first channel response estimate is a channel frequency response estimate approximating the frequency response of the wireless channel over the second set of frequency resources.

In Example 112, the subject matter of any one of Examples 86 to 111 can optionally include wherein the second channel response estimate is a channel frequency response estimate approximating the frequency response of the wireless channel over the first set of frequency resources.

In Example 113, the subject matter of any one of Examples 86 to 112 can optionally include wherein the first set of frequency resources is a first set of one or more subcarriers an the second set of frequency resources is a second set of one or more subcarriers.

In Example 114, the subject matter of Example 113 can optionally be further configured to receive the reference signal from the second mobile terminal device over the wireless channel on the second set of one or more subcarriers.

In Example 115, the subject matter of Example 114 can optionally include wherein the second set of one or more subcarriers is a subset of the first set of one or more subcarriers.

In Example 116, the subject matter of Example 86 or 87 can optionally include wherein calculating the first channel response estimate for the second set of frequency resources of the wireless channel using the reference signal derived from the second mobile terminal device includes calculating a frequency domain representation of the reference signal, and calculating the first channel response estimate using the frequency domain representation of the reference signal.

In Example 117, the subject matter of any one of Examples 86 to 116 can optionally be further configured to receive system information from the mobile communication network indicating that the first set of frequency resources are allocated for the wireless channel.

In Example 118, the subject matter of any one of Examples 86 to 117 can optionally include wherein the first set of frequency resources are a subset of frequency resources allocated by the mobile communication network for uplink mobile communications.

In Example 119, the subject matter of any one of Examples 86 to 118 can optionally be further configured to receive the reference signal from the second mobile terminal device over the wireless channel.

In Example 120, the subject matter of Example 119 can optionally include wherein receiving the reference signal from the second mobile terminal device over the wireless channel includes receiving the reference signal on the second set of frequency resources of the wireless channel.

In Example 121, the subject matter of Example 120 can optionally include wherein the second set of frequency resources is a subset of the first set of frequency resources.

In Example 122, the subject matter of Example 121 can optionally include wherein the wireless channel is a Proximity Services (ProSe) link with the second mobile terminal device.

In Example 123, the subject matter of any one of Examples 86 to 122 can optionally include wherein the reference signal is a Primary Sidelink Synchronization Signal (PSSS) or a Secondary Sidelink Synchronization Signal (SSSS).

In Example 124, the subject matter of any one of Examples 86 to 123 can optionally include wherein the first set of frequency resources include a first set of subcarriers and the second set of frequency resources include a second set of subcarriers.

In Example 125, the subject matter of any one of Examples 86 to 124 can optionally include wherein the second set of frequency resources are a subset of the first set of frequency resources.

In Example 126, the subject matter of any one of Examples 86 to 125 can optionally be further configured to receive the reference signal from the second mobile terminal device on the second set of frequency resources of the wireless channel, wherein the second set of frequency resources is a subset of the first set of frequency resources.

In Example 127, the subject matter of any one of Examples 86 to 126 can optionally include wherein the wireless channel is a device-to-device wireless channel.

Example 128 is a mobile terminal device having a radio processing circuit and a baseband processing circuit adapted to interact with the radio processing circuit. The mobile terminal device is configured to identify a first set of frequency resources allocated for a wireless channel by a mobile communication network, receive a reference signal on a second set of frequency resources of the wireless channel, wherein the reference signal is derived from a second mobile terminal device, ascertain a first channel response estimate for the second set second set of frequency resources of the wireless channel using the reference signal, ascertain a second channel response estimate for the first set of frequency resources of the wireless channel using the first channel response estimate, and apply the second channel response estimate to schedule data transmission to the second mobile terminal device over the wireless channel.

In Example 129, the subject matter of Example 128 can optionally include wherein the first set of frequency resources has a greater bandwidth than the second set of frequency resources In Example 130, the subject matter of Example 128 or 129 can optionally include wherein applying the second channel response estimate to schedule data transmission to the second mobile terminal device over the wireless channel includes performing one of frequency resource selection, modulation scheme selection, or coding rate selection based on the second channel response estimate.

In Example 131, the subject matter of Example 128 or 129 can optionally be further configured to transmit a scheduling message intended for the second mobile terminal device over the wireless channel indicating a third set of frequency resources for data transmission.

In Example 132, the subject matter of Example 131 can optionally be further configured to transmit data intended for the second mobile terminal device over the wireless channel using the third set of frequency resources.

In Example 133, the subject matter of Example 131 can optionally include wherein applying the second channel response estimate to schedule data transmission intended for the second mobile terminal device over the wireless channel further including selecting the third set of frequency resources using the second channel response estimate.

In Example 134, the subject matter of Example 128 or 129 can optionally be further configured to transmit a scheduling message intended for the second mobile terminal device over the wireless channel indicating a modulation scheme for data transmission.

In Example 135, the subject matter of Example 134 can optionally be further configured to transmit data intended for the second mobile terminal device over the wireless channel using the modulation scheme.

In Example 136, the subject matter of Example 135 can optionally be further configured to transmit a scheduling message intended for the second mobile terminal device over the wireless channel indicating a coding rate for data transmission.

In Example 137, the subject matter of Example 136 can optionally be further configured to transmit data intended for the second mobile terminal device over the wireless channel using the coding rate.

In Example 138, the subject matter of any one of Examples 128 to 137 can optionally include wherein the second channel response estimate approximates the frequency response of the wireless channel over the first set of frequency resources.

In Example 139, the subject matter of any one of Examples 128 to 138, wherein the can optionally include set of frequency resources is a set of subcarriers allocated by the mobile communication network for Proximity Services (ProSe).

In Example 140, the subject matter of Example 128 or 129 can optionally include wherein applying the second channel response estimate to schedule data transmission intended for the second mobile terminal device over the wireless channel includes selecting a third set of frequency resources of the wireless channel using the second channel response estimate, and transmitting data intended for the second mobile terminal device over the wireless channel using the third set of frequency resources.

In Example 141, the subject matter of Example 140 can optionally include wherein selecting the third set of frequency resources of the wireless channel using the second channel response estimate includes identifying one or more frequency resources of the first set of frequency resources of the wireless channel that have strong channel conditions according to the second channel response estimate, and selecting the one or more frequency resources as the third set of frequency resources.

In Example 142, the subject matter of Example 140 can optionally include wherein the third set of frequency resources are a subset of the first set of frequency resources.

In Example 143, the subject matter of any one of Examples 128 to 142 can optionally include wherein the first channel response estimate is a channel frequency response estimate approximating the frequency response of the wireless channel over the second set of frequency resources, and wherein ascertaining the first channel response estimate for the second set of frequency resources of the wireless channel using the reference signal derived from the second mobile terminal device includes calculating a frequency domain representation of the reference signal, and calculating the first channel response estimate using the frequency domain representation of the reference signal.

In Example 144, the subject matter of Example 143 can optionally include wherein ascertaining the frequency domain representation of the reference signal includes applying a Fast Fourier Transform to the reference signal to calculate the frequency domain representation of the reference signal.

In Example 145, the subject matter of Example 128 or 129 can optionally include wherein the first channel response estimate is a first channel frequency response estimate approximating the frequency response of the wireless channel over the second set of frequency resources and the second channel response estimate is a second channel frequency response estimate approximating the frequency response of the wireless channel over the first set of frequency resources, and wherein ascertaining the second channel response estimate for the first set of frequency resources of the wireless channel using the first channel response estimate includes calculating a channel impulse response estimate for the wireless channel using the first channel frequency response estimate, and calculating the second channel frequency response estimate using the channel impulse response.

In Example 146, the subject matter of Example 128 or 129 can optionally include wherein ascertaining the second channel response estimate for the first set of frequency resources of the wireless channel using the first channel response estimate includes calculating a channel impulse response estimate for the wireless channel using the first channel response estimate, and calculating the second channel response estimate as a channel frequency response estimate of the wireless channel over the first set of frequency resources using the channel impulse response estimate.

In Example 147, the subject matter of Example 146 can optionally include wherein the first channel response estimate and the second channel response estimate are channel frequency response estimates of the wireless channel.

In Example 148, the subject matter of Example 146 can optionally include wherein the first channel response estimate approximates the channel frequency response of the wireless channel over the second set of frequency resources and the second channel response estimate approximates the channel frequency response of the wireless channel over the first set of frequency resources.

In Example 149, the subject matter of Example 146 can optionally include wherein ascertaining the channel impulse response estimate for the wireless channel using the first channel response estimate includes applying at least one of least squares (LS) estimation, minimum mean square error (MMSE) estimation (MMSE), or linear minimum mean square error (LMMSE) estimation to the first channel response estimate to calculate the channel response estimate.

In Example 150, the subject matter of Example 146 can optionally include wherein ascertaining the second channel response estimate as the channel frequency response estimate of the wireless channel over the first set of frequency resources using the channel impulse response estimate includes applying a Fourier transform to the channel impulse response estimate to calculate the second channel response estimate.

In Example 151, the subject matter of Example 150 can optionally include wherein applying the Fast Fourier Transform (FFT) to the channel impulse response estimate to obtain the second channel response estimate includes applying a partial Fast Fourier Transform (FFT) matrix corresponding to the first set of frequency resources to the channel impulse response estimate to calculate the second channel response estimate.

In Example 152, the subject matter of any one of Examples 128 to 151 can optionally include wherein the first channel response estimate is a channel frequency response estimate approximating the frequency response of the wireless channel over the second set of frequency resources.

In Example 153, the subject matter of any one of Examples 128 to 152 can optionally include wherein the first channel response estimate is a channel frequency response estimate approximating the frequency response of the wireless channel over the second set of frequency resources.

In Example 154, the subject matter of any one of Examples 128 to 153 can optionally include wherein the second channel response estimate is a channel frequency response estimate approximating the frequency response of the wireless channel over the first set of frequency resources.

In Example 155, the subject matter of any one of Examples 128 to 154 can optionally include wherein the first set of frequency resources is a first set of one or more subcarriers an the second set of frequency resources is a second set of one or more subcarriers.

In Example 156, the subject matter of Example 155 can optionally include wherein receiving the reference signal on the second set of frequency resources of the wireless channel includes receiving the reference signal from the second mobile terminal device over the wireless channel on the second set of one or more subcarriers.

In Example 157, the subject matter of Example 155 can optionally include wherein the second set of one or more subcarriers is a subset of the first set of one or more subcarriers.

In Example 158, the subject matter of Example 128 or 129 can optionally include wherein ascertaining the first channel response estimate for the second set of frequency resources of the wireless channel using the reference signal derived from the second mobile terminal device includes calculating a frequency domain representation of the reference signal, and calculating the first channel response estimate using the frequency domain representation of the reference signal.

In Example 159, the subject matter of any one of Examples 128 to 158 can optionally be further configured to receive system information from the mobile communication network indicating that the first set of frequency resources are allocated for the wireless channel.

In Example 160, the subject matter of any one of Examples 128 to 159 can optionally include wherein the first set of frequency resources are a subset of frequency resources allocated by the mobile communication network for uplink mobile communications.

In Example 161, the subject matter of any one of Examples 128 to 160 can optionally include wherein the wireless channel is a Proximity Services (ProSe) link with the second mobile terminal device.

In Example 162, the subject matter of any one of Examples 128 to 161 can optionally include wherein the first set of frequency resources include a first set of subcarriers and the second set of frequency resources include a second set of subcarriers.

In Example 163, the subject matter of any one of Examples 128 to 162 can optionally include wherein the second set of frequency resources are a subset of the first set of frequency resources.

In Example 164, the subject matter of any one of Examples 128 to 163 can optionally include wherein the wireless channel is a device-to-device wireless channel.

Example 165 is a baseband modem having one or more digital processing circuits, the baseband modem configured to identify a first set of frequency resources allocated for a wireless channel by a mobile communication network, calculate a first channel response estimate for a second set of frequency resources of the wireless channel using a reference signal derived from a mobile terminal device, wherein the reference signal is distributed across the second set of frequency resources of the wireless channel, calculate a second channel response estimate for the first set of frequency resources of the wireless channel using the first channel response estimate, and apply the second channel response estimate to schedule data transmission intended for the mobile terminal device over the wireless channel.

In Example 166, the subject matter of Example 165 can optionally include wherein the first set of frequency resources includes a greater bandwidth of the wireless channel than the second set of frequency resources.

In Example 167, the subject matter of Example 165 or 166 can optionally include wherein applying the second channel response estimate to schedule data transmission intended for the mobile terminal device over the wireless channel includes performing one of frequency resource selection, modulation scheme selection, or coding rate selection based on the second channel response estimate.

In Example 168, the subject matter of Example 165 or 166 can optionally be further configured to transmit a scheduling message intended for the mobile terminal device over the wireless channel indicating a third set of frequency resources for data transmission.

In Example 169, the subject matter of Example 168 can optionally be further configured to transmit data intended for the mobile terminal device over the wireless channel using the third set of frequency resources.

In Example 170, the subject matter of Example 168 can optionally include wherein applying the second channel response estimate to schedule data transmission intended for the mobile terminal device over the wireless channel further including selecting the third set of frequency resources using the second channel response estimate.

In Example 171, the subject matter of Example 165 or 166 can optionally be further configured to transmit a scheduling message intended for the mobile terminal device over the wireless channel indicating a modulation scheme for data transmission.

In Example 172, the subject matter of Example 171 can optionally be further configured to transmit data intended for the mobile terminal device over the wireless channel using the modulation scheme.

In Example 173, the subject matter of Example 165 or 166 can optionally be further configured to transmit a scheduling message intended for the mobile terminal device over the wireless channel indicating a coding rate for data transmission.

In Example 174, the subject matter of Example 173 can optionally be further configured to transmit data intended for the mobile terminal device over the wireless channel using the coding rate.

In Example 175, the subject matter of any one of Examples 165 to 174 can optionally include wherein the second channel response estimate approximates the frequency response of the wireless channel over the first set of frequency resources.

In Example 176, the subject matter of any one of Examples 165 to 175 can optionally include wherein the first set of frequency resources is a set of subcarriers allocated by the mobile communication network for Proximity Services (ProSe).

In Example 177, the subject matter of Example 165 or 166 can optionally include wherein applying the second channel response estimate to schedule data transmission intended for the mobile terminal device over the wireless channel includes selecting a third set of frequency resources of the wireless channel using the second channel response estimate, and transmitting data intended for the mobile terminal device over the wireless channel using the third set of frequency resources.

In Example 178, the subject matter of Example 177 can optionally include wherein selecting the third set of frequency resources of the wireless channel using the second channel response estimate includes identifying one or more frequency resources of the first set of frequency resources of the wireless channel that have strong channel conditions according to the second channel response estimate, and selecting the one or more frequency resources as the third set of frequency resources.

In Example 179, the subject matter of Example 178 can optionally include wherein the third set of frequency resources are a subset of the first set of frequency resources.

In Example 180, the subject matter of any one of Examples 165 to 179 can optionally include wherein the first channel response estimate is a channel frequency response estimate approximating the frequency response of the wireless channel over the second set of frequency resources, and wherein calculating the first channel response estimate for the second set of frequency resources of the wireless channel using the reference signal derived from the mobile terminal device includes calculating a frequency domain representation of the reference signal, and calculating the first channel response estimate using the frequency domain representation of the reference signal.

In Example 181, the subject matter of Example 180 can optionally include wherein calculating the frequency domain representation of the reference signal includes applying a Fast Fourier Transform to the reference signal to calculate the frequency domain representation of the reference signal.

In Example 182, the subject matter of Example 165 or 166 can optionally include wherein the first channel response estimate is a first channel frequency response estimate approximating the frequency response of the wireless channel over the second set of frequency resources and the second channel response estimate is a second channel frequency response estimate approximating the frequency response of the wireless channel over the first set of frequency resources, and wherein calculating the second channel response estimate for the first set of frequency resources of the wireless channel using the first channel response estimate includes calculating a channel impulse response estimate for the wireless channel using the first channel frequency response estimate, and calculating the second channel frequency response estimate using the channel impulse response.

In Example 183, the subject matter of Example 165 or 166 can optionally include wherein calculating the second channel response estimate for the first set of frequency resources of the wireless channel using the first channel response estimate includes calculating a channel impulse response estimate for the wireless channel using the first channel response estimate, and calculating the second channel response estimate as a channel frequency response estimate of the wireless channel over the first set of frequency resources using the channel impulse response estimate.

In Example 184, the subject matter of Example 183 can optionally include wherein the first channel response estimate and the second channel response estimate are channel frequency response estimates of the wireless channel.

In Example 185, the subject matter of Example 183 can optionally include wherein the first channel response estimate approximates the channel frequency response of the wireless channel over the second set of frequency resources and the second channel response estimate approximates the channel frequency response of the wireless channel over the first set of frequency resources.

In Example 186, the subject matter of Example 183 can optionally include wherein calculating the channel impulse response estimate for the wireless channel using the first channel response estimate includes applying at least one of least squares (LS) estimation, minimum mean square error (MMSE) estimation (MMSE), or linear minimum mean square error (LMMSE) estimation to the first channel response estimate to calculate the channel response estimate.

In Example 187, the subject matter of Example 183 can optionally include wherein calculating the second channel response estimate as the channel frequency response estimate of the wireless channel over the first set of frequency resources using the channel impulse response estimate includes applying a Fourier transform to the channel impulse response estimate to calculate the second channel response estimate.

In Example 188, the subject matter of Example 187 can optionally include wherein applying the Fourier transform to the channel impulse response estimate to obtain the second channel response estimate includes applying a Fast Fourier Transform (FFT) to the channel impulse response estimate to calculate the second channel response estimate.

In Example 189, the subject matter of Example 188 can optionally include wherein applying the Fast Fourier Transform (FFT) to the channel impulse response estimate to obtain the second channel response estimate includes applying a partial Fast Fourier Transform (FFT) matrix corresponding to the first set of frequency resources to the channel impulse response estimate to calculate the second channel response estimate.

In Example 190, the subject matter of any one of Examples 165 to 189 can optionally include wherein the first channel response estimate is a channel frequency response estimate approximating the frequency response of the wireless channel over the second set of frequency resources.

In Example 191, the subject matter of any one of Examples 165 to 190 can optionally include wherein the second channel response estimate is a channel frequency response estimate approximating the frequency response of the wireless channel over the first set of frequency resources.

In Example 192, the subject matter of any one of Examples 165 to 191 can optionally include wherein the first set of frequency resources is a first set of one or more subcarriers an the second set of frequency resources is a second set of one or more subcarriers.

In Example 193, the subject matter of Example 192 can optionally be further configured to receive the reference signal from the mobile terminal device over the wireless channel on the second set of one or more subcarriers.

In Example 194, the subject matter of Example 193 can optionally include wherein the second set of one or more subcarriers is a subset of the first set of one or more subcarriers.

In Example 195, the subject matter of Example 165 or 166 can optionally include wherein calculating the first channel response estimate for the second set of frequency resources of the wireless channel using the reference signal derived from the mobile terminal device includes calculating a frequency domain representation of the reference signal, and calculating the first channel response estimate using the frequency domain representation of the reference signal.

In Example 196, the subject matter of any one of Examples 165 to 195 can optionally be further configured to receive system information from the mobile communication network indicating that the first set of frequency resources are allocated for the wireless channel.

In Example 197, the subject matter of any one of Examples 165 to 196 can optionally include wherein the first set of frequency resources are a subset of frequency resources allocated by the mobile communication network for uplink mobile communications.

In Example 198, the subject matter of any one of Examples 165 to 197 can optionally be further configured to receive the reference signal from the mobile terminal device over the wireless channel.

In Example 199, the subject matter of Example 198 can optionally include wherein receiving the reference signal from the mobile terminal device over the wireless channel includes receiving the reference signal on the second set of frequency resources of the wireless channel.

In Example 200, the subject matter of Example 199 can optionally include wherein the second set of frequency resources is a subset of the first set of frequency resources.

In Example 201, the subject matter of Example 200 can optionally include wherein the wireless channel is a Proximity Services (ProSe) link with the mobile terminal device.

In Example 202, the subject matter of any one of Examples 165 to 201 can optionally include wherein the reference signal is a Primary Sidelink Synchronization Signal (PSSS) or a Secondary Sidelink Synchronization Signal (SSSS).

In Example 203, the subject matter of any one of Examples 165 to 202 can optionally include wherein the first set of frequency resources include a first set of subcarriers and the second set of frequency resources include a second set of subcarriers.

In Example 204, the subject matter of any one of Examples 165 to 203 can optionally include wherein the second set of frequency resources are a subset of the first set of frequency resources.

In Example 205, the subject matter of any one of Examples 165 to 204 can optionally be further configured to receive the reference signal from the mobile terminal device on the second set of frequency resources of the wireless channel, wherein the second set of frequency resources is a subset of the first set of frequency resources.

In Example 206, the subject matter of any one of Examples 165 to 205 can optionally include wherein the wireless channel is a device-to-device wireless channel.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile terminal device having a radio processing circuit and a baseband processing circuit adapted to interact with the radio processing circuit, the mobile terminal device configured to:

identify a first set of frequency resources allocated for a wireless channel by a mobile communication network;

calculate a first channel response estimate for a second set of frequency resources of the wireless channel using a reference signal derived from a second mobile terminal device, wherein the reference signal is distributed across the second set of frequency resources of the wireless channel;

calculate a channel impulse response estimate for the wireless channel based on the first channel frequency response estimate;

calculate a second channel response estimate for the first set of frequency resources of the wireless channel based on the channel impulse response estimate; and apply the second channel response estimate to schedule data transmission intended for the second mobile terminal device over the wireless channel.

2. The mobile terminal device of claim 1, wherein the first set of frequency resources has a greater bandwidth of the wireless channel than the second set of frequency resources.

3. The mobile terminal device of claim 1, wherein applying the second channel response estimate to schedule data transmission intended for the second terminal device over the wireless channel comprises:

performing one of frequency resource selection, modulation scheme selection, or coding rate selection based on the second channel response estimate.

4. The mobile terminal device of claim 1, wherein applying the second channel response estimate to schedule data transmission intended for the second mobile terminal device over the wireless channel comprises:

selecting a third set of frequency resources of the wireless channel using the second channel response estimate; and transmitting data intended for the second mobile terminal device over the wireless channel using the third set of frequency resources.

5. The mobile terminal device of claim 4, wherein selecting the third set of frequency resources of the wireless channel using the second channel response estimate comprises:

identifying one or more frequency resources of the first set of frequency resources of the wireless channel that have strong channel conditions according to the second channel response estimate; and selecting the one or more frequency resources as the third set of frequency resources.

6. The mobile terminal device of claim 5, wherein the third set of frequency resources are a subset of the first set of frequency resources.

7. The mobile terminal device of claim 1, wherein calculating the channel impulse response estimate for the wireless channel using the first channel response estimate comprises:

applying at least one of least squares (LS) estimation, minimum mean square error (MMSE) estimation (MMSE), or linear minimum mean square error (LMMSE) estimation to the first channel response estimate to calculate the channel response estimate.

8. The mobile terminal device of claim 1, wherein the reference signal is a Primary Sidelink Synchronization Signal (PSSS) or a Secondary Sidelink Synchronization Signal (SSSS).

9. The mobile terminal device of claim 1, wherein the first set of frequency resources comprise a first set of subcarriers and the second set of frequency resources comprise a second set of subcarriers.

10. The mobile terminal device of claim 1, further configured to receive the reference signal from the second mobile terminal device on the second set of frequency resources of the wireless channel, wherein the second set of frequency resources is a subset of the first set of frequency resources.

11. The mobile terminal device of claim 1, wherein the wireless channel is a device-to-device wireless channel.

12. A method of performing communications, the method comprising:

identifying a first set of frequency resources allocated for a wireless channel by a mobile communication network;

calculating a first channel response estimate for a second set of frequency resources of the wireless channel using a reference signal derived from a terminal device, wherein the reference signal is distributed across the second set of frequency resources of the wireless channel;

calculating a channel impulse response estimate for the wireless channel based on the first channel frequency response estimate;

calculating a second channel response estimate for the first set of frequency resources of the wireless channel based on the channel impulse response estimate; and applying the second channel response estimate to schedule data transmission intended for the terminal device over the wireless channel.

13. The method of claim 12, wherein the first set of frequency resources has a greater bandwidth of the wireless channel than the second set of frequency resources.

14. The method of claim 12, wherein applying the second channel response estimate to schedule data transmission intended for the terminal device over the wireless channel further comprises:

performing one of frequency resource selection, modulation scheme selection, or coding rate selection based on the second channel response estimate.

15. The method of claim 12, wherein the first set of frequency resources is a set of subcarriers allocated by the mobile communication network for Proximity Services (ProSe).

16. The method of claim 12, wherein applying the second channel response estimate to schedule data transmission intended for the terminal device over the wireless channel further comprises:

selecting a third set of frequency resources of the wireless channel using the second channel response estimate; and transmitting data intended for the terminal device over the wireless channel using the third set of frequency resources.

17. The method of claim 12, wherein calculating the second channel response estimate for the first set of frequency resources of the wireless channel using the first channel response estimate further comprises:

calculating a channel impulse response estimate for the wireless channel using the first channel response estimate; and calculating the second channel response estimate as a channel frequency response estimate of the wireless channel over the first set of frequency resources using the channel impulse response estimate.

18. The method of claim 17, wherein the first channel response estimate approximates the channel frequency response of the wireless channel over the second set of frequency resources and the second channel response estimate approximates the channel frequency response of the wireless channel over the first set of frequency resources.

19. The method of claim 17, wherein calculating the channel impulse response estimate for the wireless channel using the first channel response estimate comprises:
applying at least one of least squares (LS) estimation, minimum mean square error (MMSE) estimation (MMSE), or linear minimum mean square error (LMMSE) estimation to the first channel response estimate to calculate the channel response estimate.

20. The method of claim 12, wherein the reference signal is a Primary Sidelink Synchronization Signal (PSSS) or a Secondary Sidelink Synchronization Signal (SSSS).

21. The method of claim 12, further comprising receiving the reference signal from the terminal device on the second set of frequency resources of the wireless channel, wherein the second set of frequency resources is a subset of the first set of frequency resources.

22. The method of claim 12, wherein the wireless channel is a device-to-device wireless channel.

23. A mobile terminal device having a radio processing circuit and a baseband processing circuit adapted to interact with the radio processing circuit, the mobile terminal device configured to:
identify a first set of frequency resources allocated for a wireless channel by a mobile communication network;
calculate a first channel response estimate for a second set of frequency resources of the wireless channel using a reference signal derived from a second mobile terminal device, wherein the reference signal is distributed across the second set of frequency resources of the wireless channel;
calculate a second channel response estimate for the first set of frequency resources of the wireless channel using the first channel response estimate, wherein calculating the second channel response estimate for the first set of frequency resources of the wireless channel using the first channel response estimate comprises calculating a channel impulse response estimate for the wireless channel using the first channel frequency response estimate, and calculating the second channel frequency response estimate using the channel impulse response estimate; and
apply the second channel response estimate to schedule data transmission intended for the second mobile terminal device over the wireless channel,
wherein the first channel response estimate is a first channel frequency response estimate approximating the frequency response of the wireless channel over the second set of frequency resources and the second channel response estimate is a second channel frequency response estimate approximating the frequency response of the wireless channel over the first set of frequency resources.

* * * * *